(12) United States Patent
Klughart

(10) Patent No.: US 8,836,292 B1
(45) Date of Patent: Sep. 16, 2014

(54) ELECTRIC POWER GENERATION SYSTEM AND METHOD

(76) Inventor: Kevin Mark Klughart, Denton, TX (US)

(*) Notice: Subject to any disclaimer, the term of this patent is extended or adjusted under 35 U.S.C. 154(b) by 728 days.

(21) Appl. No.: 13/066,488

(22) Filed: Apr. 15, 2011

(51) Int. Cl.
*H02H 7/06* (2006.01)
*H02P 11/00* (2006.01)
*H02P 9/00* (2006.01)

(52) U.S. Cl.
USPC ............................... 322/24; 322/44; 322/28

(58) Field of Classification Search
USPC ............................ 322/24, 28, 20, 44
See application file for complete search history.

(56) References Cited

U.S. PATENT DOCUMENTS

| | | | | |
|---|---|---|---|---|
| 3,564,391 | A * | 2/1971 | Dinger | 322/25 |
| 4,442,396 | A * | 4/1984 | Hucker | 322/21 |
| 5,376,876 | A * | 12/1994 | Bauser et al. | 322/28 |
| 6,396,137 | B1 | 5/2002 | Klughart | |
| 6,903,477 | B2 * | 6/2005 | Kusase et al. | 310/180 |
| 7,224,204 | B2 | 5/2007 | Walter | |
| 2005/0146308 | A1 * | 7/2005 | Quazi et al. | 322/28 |
| 2006/0038540 | A1 * | 2/2006 | O'Gorman et al. | 322/28 |
| 2006/0164046 | A1 * | 7/2006 | O'Gorman et al. | 322/28 |
| 2007/0029978 | A1 * | 2/2007 | Renehan et al. | 322/28 |
| 2008/0238108 | A1 * | 10/2008 | Edelson et al. | 290/40 C |
| 2009/0212746 | A1 * | 8/2009 | Conway et al. | 322/20 |

OTHER PUBLICATIONS

Linear Technology Corporation (datasheet); LTC4352 Low Voltage Ideal Diode Controller With Monitoring; www.linear.com; 2008; USA.
Linear Technology Corporation (datasheet); LTC4354 Negative Voltage Diode or Controller and Monitor; www.linear.com; 2004; USA.
Linear Technology Corporation (datasheet); LTC4355 Positive Voltage Ideal or With Input Supply and Fuse Monitors; www.linear.com; 2007; USA.
Linear Technology Corporation (datasheet); LTC4356 Surge Stopper; www.linear.com; 2009; USA.
Linear Technology Corporation (datasheet); LTC4357 Positive Voltage Ideal Diode Controller; www.linear.com; 2007; USA.
Linear Technology Corporation (datasheet); LTC3890 60V, Low IQ, Dual, 2-Phase Synchronous Step-Down DC/DC Controller; www.linear.com; 2010; USA.
Fairchild Semiconductor (datasheet); FDB3632/FDP3632/FDI3632/FDH3632 N-Channel Power-Trench Mosfet; www.fairchildsemi.com; Dec. 2008; USA.

(Continued)

*Primary Examiner* — Julio C. Gonzalez
(74) *Attorney, Agent, or Firm* — Carstens & Cahoon, LLP; Kevin M. Klughart; David W. Carstens

(57) ABSTRACT

An electric power generation system and method that permits enhanced power generation efficiency when applied to rotating electric power generation systems is disclosed. The system may be broadly described as generally improving energy generation efficiency by improving the efficiency of electric current extraction from stator coils in many alternator-based electric power generation systems. The system disclosed comprises a number of preferred embodiments, some of which utilize buck-boost converter technologies in conjunction with super-diode excitation/rectification to minimize $I^2R$ power losses within rotating power generation system components while at the same time reducing heat losses and thus increasing overall rectification circuitry system reliability. The method disclosed generally monitors the position of rotating field coil(s) within a stator coil(s) assembly and excites these coil(s) depending on the desired/demand output power level of the power generation system and the detected position of the field coil(s) in relation to the stator coil(s).

20 Claims, 28 Drawing Sheets

(56) References Cited

OTHER PUBLICATIONS

Vishay Semiconductor (datasheet); MBR10100, MBRF10100, MBRB10100 High Voltage Schottky Rectifiers; www.vishay.com; Jan. 7, 2002; USA.
On Semiconductor (datasheet); NTMFS4833N Power Mosfet; www.onsemi.com; May 2010; USA.
Peterbilt (Division of Paccar); Peterbilt Essentials Module 10; pp. 7-8; Jul. 7, 2008; USA.
Robert Bosch LLC; Starter Motors and Generators; www.bosch.us; Jul. 29, 2007; USA.
Robert Bosch LLC; 160A Long Haul Alternator; www.bosch.com; unknown; USA.
Rob Legg; Simple Mosfet Rectifier Control; internet posting; unknown publication date; USA.
Texas Instruments (application note); Design and Application Guide for High Speed Mosfet Gate Drive Circuits; http://focus.ti.com/lit/ml/slup169/slup169.pdf; unknown; USA.
Texas Instruments (datasheet); UCC24610 Green Rectifier Controller Device; www.ti.com; Sep. 2010; USA.

* cited by examiner

*Prior Art*

0200

0210

0220

*Prior Art*

*Prior Art*

*Prior Art*

*Prior Art*

ELECTRIC POWER GENERATION SYSTEM AND METHOD

CROSS-REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to electric power generation systems, and is specifically applicable to alternator based electric power generation systems installed in automobile, trucks, and the like.

PRIOR ART AND BACKGROUND OF THE INVENTION

Conventional Alternator (0100)

As generally illustrated in FIG. 1 (0100), conventional alternator-based power generation systems excite field coils (0101) within a rotating structure (0102). Electricity to support this field coil (0101) excitation is supplied from a power source (0103) and is directed to the field coils (0101) via the use of commutator rings (0104, 0105) and is generally regulated by a current and/or voltage regulator (0106) that is connected to the ground return path (0107) (A-circuit or grounded field regulator configuration). In some prior art configurations, the regulator (0106) is connected in series with the power source (0103) and a first commutator ring (0104), with the remaining commutator ring (0105) being tied to the return ground (0107) (B-circuit or switched field regulator configuration).

The stator coils (0108, 0109) become excited by the rotating (0102) field created by the field coil (0101) and generate an alternating current (AC) voltage that is rectified by diodes (0110, 0111) before being supplied as V+ output voltage (0112) from the power generation system.

Polyphase Power Generation (0200)

Note that the prior art system as generally illustrated in FIG. 1 (0100) is illustrated as a single-phase AC power generation system. Many, if not most, alternators implemented today implement this system in a polyphase configuration with three or more stator coil pairs (0108, 0109) to improve overall AC ripple in the V+DC output (0112). Examples of this prior art topologies are generally illustrated in FIG. 2 (0200).

In cases where the stator coil(s) implement 3-phase power generation, the stator coils may be configured in a Wye configuration as depicted in FIG. 2 (0210) (providing higher output voltages but lower overall current performance) or in a Delta configuration (0220) (providing lower output voltages but higher overall current performance). Wye configurations (0210) are generally required in situations where any reasonable performance at low engine RPM is desired.

Field Rotor Coil Regulation (0300)

Regulation of the output of a convention alternator within the context of the prior art is generally determined by modulation of the voltage/current applied to the field rotor coil exclusively, as generally illustrated by the prior art schematic of FIG. 3 (0300). With the exception of the use of the battery and an auxiliary filter capacitor, the prior art generally provides for little regulation of the output voltage of the alternator-based power generation system used in traditional automobile/truck environments. This can and has presented problems for modern electronic vehicle systems as supply regulation issues generally are ignored in the design of most prior art systems using this architecture.

Low RPM Output Performance (0400)

It should be noted and as generally illustrated in FIG. 4 (0400), many conventional alternator systems do not begin producing electric power until a certain minimum field coil rotational speed is achieved. For example, in the sample data set illustrated in FIG. 4 (0410), alternator output does not begin to occur until after 1000 RPM shaft rotation speed. Even in systems that do provide power at lower RPMs, generally the power output of these systems is dramatically reduced at low engine RPM. This can present significant issues in scenarios where the engine RPM is minimized to conserve fuel.

Despite recent attempts to produce high efficiency alternator systems, even these systems have poor low speed output performance. As generally illustrated in the high efficiency truck alternator system of FIG. 4 (0420), rotational speeds below 1500 RPM generally produce negligible power output with even these high efficiency systems.

For this reason, most automotive and diesel truck alternator systems operate at 2-4× the engine rotational speed. Given that 30-40% of the operating time of a diesel engine is at idle speed and that truck alternators generally provide only 30-40% of their rated output under these conditions, the necessity for an increase in rotational speed (typically via appropriate engine/alternator pulley ratios) is required in these systems to reach an alternator RPM sufficient to produce substantial output power. The drawback with the use of elevated alternator RPM at low engine RPM is that at elevated engine RPM the increased alternator RPM results in lower overall alternator lifetime, reduced system reliability, and increased rotational losses within the alternator frame and fan. For example, an engine/alternator pulley ratio of three (3) with an engine speed of 3000 RPM requires that the alternator bearings support rotational velocity of 9000 RPM. This elevated rotational velocity increases bearing frictional heat within the alternator and results in decreased bearing life and reduced overall alternator reliability, as well as increasing the alternator load on the engine during periods where the alternator is not activated to produce electricity.

Deficiencies in the Prior Art

The prior art as detailed above suffers from the following deficiencies:
- The rectifier diodes (0110, 0112) can generate significant amounts of heat as the current draw from the system is increased. This is due to the generally fixed 0.6 VDC voltage drop across these elements irrespective of current draw. Given that the power dissipated is proportional to the diode voltage drop times the series current, this presents a significant inefficiency in the system as current demands on the system are increased. The use of Schottky barrier diodes has somewhat mitigated this power dissipation but even with this enhancement heat dissipation is a significant inefficiency in current alternator designs.
- High heat dissipation in the rectifier diodes (0110, 0111) creates long term reliability issues with these devices.
- In some high capacity energy generation systems, water cooling has been by necessity used to augment air cooling of the diodes (0110, 0111), creating additional cost and complexity in the overall system.
- As higher current demands have been made of these power generation systems, the field (0101) and stator (0108, 0109) have necessarily been increased in size and wire gauge to handle the increased current demands. As such, the power loss in these windings has increased as the SQUARE of the current drain on the system. This necessitates heavier alternator configurations that are both inefficient to spin and inefficient to transport, thus impacting overall automobile/truck fuel economy.
- As generally illustrated in FIG. 4 (0400), the minimum shaft rotation speed needed to begin power generation is generally a significant disadvantage in engine driven systems that are optimally operated at low shaft rotation speeds. This minimum threshold for shaft rotation is a deficiency not generally addressed by the prior art.
- Increased alternator rotational speed (via the use of engine/alternator pulley ratios greater than unity) result in significant engine loading at elevated engine speeds when the alternator is generally not producing electricity. This increased loading is a result of the fact that the rotational power required to rotate the alternator fan is proportional to the CUBE of the rotational shaft speed (RPM) of the alternator. I.e., $(kW1/kW2)=(RPM1/RPM2)^3$, where kW indicates the power requirement for shaft rotation and RPM indicates the shaft rotational velocity. For example, increasing the shaft RPM of the alternator 10% increases the power consumed by the alternator fan by 33%.
- Output voltage regulation of traditional prior art alternator-based power generation systems is very poor, especially at low engine RPM.
- Generated output power of traditional prior art alternator-based power generation systems is very poor at low engine RPM.
- Traditional prior art alternator-base power generation systems require increased RPM at low engine RPM to produce substantial power, resulting in high engine RPM increased wear and reduced alternator component reliability and lifetime.
- Traditional alternator system performance is limited by alternator RPM speed, number of stator conductor turns, and the ability to excite field rotor coil(s) to produce sufficient rotational magnetic field strength.
- The efficiency of traditional prior art alternator-based power generation systems is limited by fan cooling loss, bearing loss, iron loss, copper loss, and the voltage drop in the diode bridges, with partial load efficiency ranging between 50-62% depending on the size of alternator and alternator speed.

While some of the prior art may teach some solutions to several of these problems, the core issue of optimizing power generation from the alternator-based systems has yet to be addressed.

Objectives of the Invention

Accordingly, the objectives of the present invention are (among others) to circumvent the deficiencies in the prior art and affect the following objectives:
(1) Provide for an electric power generation system and method that minimizes heat dissipation in the generation system.
(2) Provide for an electric power generation system and method that increases power generation system reliability.
(3) Provide for an electric power generation system and method that permits increased overall power generation for current and future vehicle electrical systems.
(4) Provide for an electric power generation system and method that permits generation of electric power at low shaft RPM values.
(5) Provide for an electric power generation system and method that increases overall power generation efficiency to promote improved vehicle fuel economy.
(6) Provide for an electric power generation system and method that reduces weight and improves overall vehicle fuel economy for the power generation system.
(7) Provide for an electric power generation system and method that improves output voltage regulation of the power generation system over convention prior art architectures.
(8) Provide for an electric power generation system and method that increases power output at low engine RPM.
(9) Provide for an electric power generation system and method that permit elimination of RPM step-up pulleys in the alternator drive train, thus minimizing alternator wear and increasing alternator reliability and longevity at high engine RPM.
(10) Provide for an electric power generation system suitable for trucks/automobiles that provides for improved efficiency over prior art alternator based power generation systems.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0500)

The present invention and typical system application as applied to an alternator-based power generation system is generally illustrated in FIG. 5 (0500). The system herein generally described is targeted in this exemplary embodiment to adapt a conventional alternator-based power generation system (0510) utilizing conventional field coil(s) (0511) and stator coil(s) (0512) as described previously. However, one skilled in the art will recognize that this preferred exemplary embodiment does not limit the overall scope of the teachings of the present invention.

In this preferred exemplary embodiment, the system comprises a field excitation subsystem (0501) that excites (using a field power source (0521)) one or more field coil(s) (0511) that induce current into one or more stator coil(s) (0512) contained within the alternator framework (0510). Output from the stator coil (s) is fed to a stator extraction subsystem (0502) that converts the stator coil(s) (0512) output to direct current to provide the required system power output (0522).

The system utilizes a phase detector (0503) in some preferred exemplary embodiments to monitor the phase relationship between the mechanical position of the field coil(s) and the stator coil(s). This phase detection permits (in some preferred exemplary embodiments) the field excitation subsystem (0501) to modulate the field coil(s) (0511) excitation voltage so that the output of the stator coil(s) is not conventional alternating current (AC) as produced by a conventional alternator, but rather pulsed direct current (DC). This pulsed DC may be more easily rectified by the stator extraction subsystem (0502) to produce the desired output power (0522) from the power generation system.

The phase detector (0503) may in some preferred exemplary embodiments provide information to the stator extraction subsystem (0502) so that switched-based rectification of the stator coil(s) (0512) output may be performed as an alternative to the use of conventional diode rectification, thus minimizing the overall power loss associated with the stator extraction subsystem (0502).

Various other preferred exemplary embodiments of the present invention incorporate boost converters within the field excitation subsystem (0501) and/or buck and/or buck-boost converters within the stator extraction subsystem (0502) and/or super-diode pass transistors within the stator extraction subsystem (0502) to improve power generation efficiency by minimizing $I^2R$ power losses within rotating power generation system components such as the field coil(s) (0501) and stator coil(s) (0502).

The present invention anticipates that in some preferred embodiments the system may incorporate computer control (0531) utilizing computer readable medium (0532) to provide programming instructions and/or data to the computer system (0531) utilizing a human interface (0533) in some preferred embodiments. These computer integrated embodiments may employ an energy efficiency profile and/or control database (0534) to monitor and/or adjust operation of the power generation system (via control of the field excitation (0501) and/or stator extraction (0502) subsystems) in order to optimize fuel economy for the engine associated with the electric power generation system.

Method Overview (0600)

The present invention method can be generally illustrated by the preferred exemplary embodiment illustrated in FIG. 6 (0600). The general steps of this method comprise the following:

Determining the phase relationship between the field rotor coil(s) and the stator coil(s) (0601);

Exciting the field coil(s) based on current phase detected in step (1), the current power demand of the generator system, and any applicable energy efficiency/control profile (0602) (the efficiency/control profile may incorporate a wide range of factors, such as engine speed, load, vehicle speed, battery charging status, electrical load, ambient temperature, engine fuel type and cost, and transport information such as route optimization, etc.);

Control the stator extraction subsystem conduction based on the phase detected in step (1), the current load demand of the generator system, and any applicable energy efficiency/control profile (0603); and Proceeding to step (1) to repeat the method control loop for the power generation system.

This general method as illustrated in FIG. 6 (0600) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
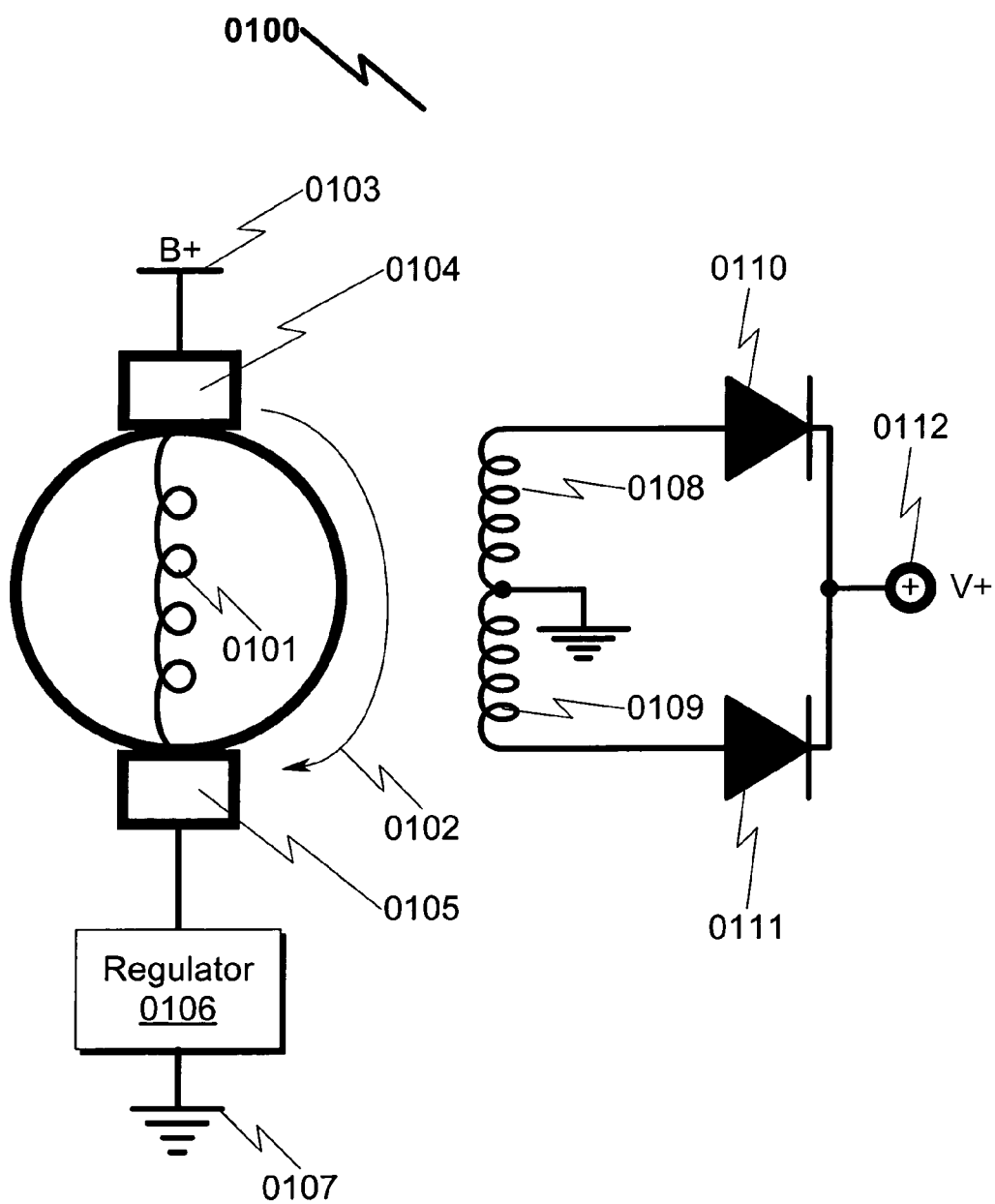
FIG. 1 illustrates a conventional prior art alternator-based electric power generation system.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an ELECTRIC POWER GENERATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Fabrication not Limitive

The present invention may be embodied using a wide variety of construction techniques. However, the present invention in many preferred embodiments may be fabricated using integrated circuit (IC) manufacturing techniques to minimize circuit volume, improve performance, and/or reduce cost. While many methodologies of fabrication may be suitable, the present invention specifically anticipates the integration of both power switching devices and integrated control logic into a single form factor as detailed in U.S. Pat. No. 6,396,137 for INTEGRATED VOLTAGE/CURRENT/POWER REGULATOR/SWITCH SYSTEM AND METHOD issued to Kevin Mark Klughart on Mar. 15, 2001 and now in the public domain. This United States Patent and the techniques taught therein are hereby incorporated by reference herein as an exemplary fabrication guideline that may be useful in the best mode fabrication of many preferred embodiments of the present invention.

Bridge Driver not Limitive

The present invention may encompass many preferred embodiments, some incorporating a bridge driver to differentially drive the field rotor coil(s). The present invention makes no limitation on the construction of this invention element, and anticipates that it may be constructed using bipolar transistors, IGBTs, SCRs, triacs, MOSFETs, (optimally) super-diodes, or the like. One skilled in the art will recognize there are many bridge driver structures compatible with the teachings of the present invention.

Alternator not Limitive

The present invention may encompass many preferred embodiments, some applicable to alternator electric power generation systems and methods. The general construction illustrated herein is not intended to limit the scope of the systems/methods discussed herein to alternator-style power generation systems. These techniques may be applied to a wide variety of power generation and power transfer systems, including but not limited to motors, generators, and the like.

Alternator Speed not Limitive

The present invention may encompass many preferred embodiments, some of which operate at reduced alternator RPM. In contrast to the prior art, one of the goals of some preferred embodiments of the present invention is to operate the alternator at a reduced RPM more compatible with that of the engine drive. Rather than utilizing pulleys (or the like) to rotate the field coil at RPM values HIGHER than the engine, the present invention attempts to increase the alternator output at low RPM values, thus permitting the use of 1:1 (or low step-up ratios) in the engine/alternator drive train. This reduction in alternator RPM in comparison to the prior art permits higher system reliability, greater power output at lower RPM (using the techniques and methods taught by the present invention) and higher system longevity. While some preferred embodiments utilize reduced alternator RPM, the present invention is not limited by this particular application.

Coil(s) not Limitive

The present invention may utilize any number of field rotor and/or stator coils in its wide range of embodiments.

Phase not Limitive

The present invention may encompass many preferred embodiments, some applicable to single and/or polyphase power generation systems. The present invention anticipates no limitation on the phase complement associated with the present invention and therefore the teachings of the present invention are applicable to both single and polyphase power generation systems equally with no loss of generality in the teaching of the present invention.

Delta/Wye Construction not Limitive

The present invention may encompass many preferred embodiments, some incorporating the use of Delta and/or Wye winding configurations within the construction of the field rotor and/or stator coil(s). The winding configurations illustrated herein do not limit the scope of the present invention and are for illustration purposes only. The present invention anticipates in some preferred exemplary embodiments the use of Delta, Wye, or hybrid winding configurations, and specifically anticipates the use of dynamically configurable winding configurations using super-diode switched configurations in some embodiments to enhance power output over a range of operating engine RPM.

Phase Detector not Limitive

The present invention may encompass many preferred embodiments, some incorporating a wide variety of phase detectors linked mechanically, magnetically, and/or optically to the field rotor to report the rotational phase relationship between the field rotor coil(s) and the stator coil(s). A wide variety of methods are available to accomplish this detection, including but not limited to Hall effect sensors, magnetic sensors, optical sensors, shaft encoders, mechanical sensors and the like, all of which are well known in the art and therefore not detailed further herein. The present invention makes no limitation on the type of phase detector that may be utilized within the context of the teachings of the present invention. Note that in some preferred embodiments of the present invention the phase detector may be implemented by electrically monitoring the output of the stator coil(s) to determine their output in response to a time-varying input to the field rotor coil(s). In these instances there may in some preferred embodiments not be a physical detector in addition to this electrical monitoring function.

Phase Control not Limitive

The present invention may encompass many preferred embodiments, some incorporating a wide variety of phase control systems. While many preferred exemplary embodiments utilize a non-overlapping two-phase control system methodology, the present invention is not limited to this particular type of topology and may encompass multi-phase control systems with or without non-overlapping phase control signals and the like.

Enclosure not Limitive

The present invention may encompass many preferred embodiments, many incorporating a wide variety of enclosures. While many preferred exemplary embodiments utilize a Totally Enclosed Fan Cooled (TEFC) enclosure, the present invention is not limited to this configuration. Since the present invention minimizes the heat dissipation associated with field/stator coils and the associated electronics used to control and regulate the output power of the power generation system, the need for open-frame enclosure systems with embedded fan cooling is substantially reduced and may be eliminated in many embodiments. The ability to totally enclose the field/stator coils and associated electronics can in some circumstance result in much higher overall system reliability and protect the system from a wide variety of environmental elements that negatively impact the reliability of conventional alternator-based power generation systems in automobiles/trucks and the like. Additionally, the need for provisions for water cooling of this configuration is minimized, thus reducing overall system complexity and cost.

Air Cooling not Limitive

The present invention may encompass many preferred embodiments, many incorporating a wide variety of cooling mechanisms. While many preferred exemplary embodiments utilize air cooling, the present invention is not limited to this configuration. Some preferred exemplary embodiments may utilize water cooling of the alternator frame. Other preferred exemplary embodiments may remotely place the alternator electronics in proximity to a battery to provide temperature control for the battery. Since some implementation environments may be in colder climates, the use of heat generated by the alternator control/rectification circuitry to stabilize the battery temperature is specifically anticipated by the present invention. Water cooling of the alternator may also be utilized in conjunction with a battery enclosure comprising a fluid cooling jacket to stabilize the battery temperature in colder climates.

DC-DC Converter not Limitive

The present invention does not limit the type of DC-DC converter that may be utilized in construction of the various invention embodiments. A wide variety of DC-DC converter topologies including boost-buck topologies (split-pi, Cuk, SEPIC, etc.), buck-boost topologies, boost topologies, and buck topologies may be incorporated within various embodiments of the present invention based on the particular application environment. A few of these topologies and situations are detailed herein, but these exemplary embodiments do not limit the overall scope of the claimed invention. Note that the use of the term "boost-buck" and "buck-boost" are not specifically limitive as to scope and may be used interchangeably when describing many of the various implementations of the present invention.

Exemplary Embodiment: Buck-Boost System (0700)

Figure 7:
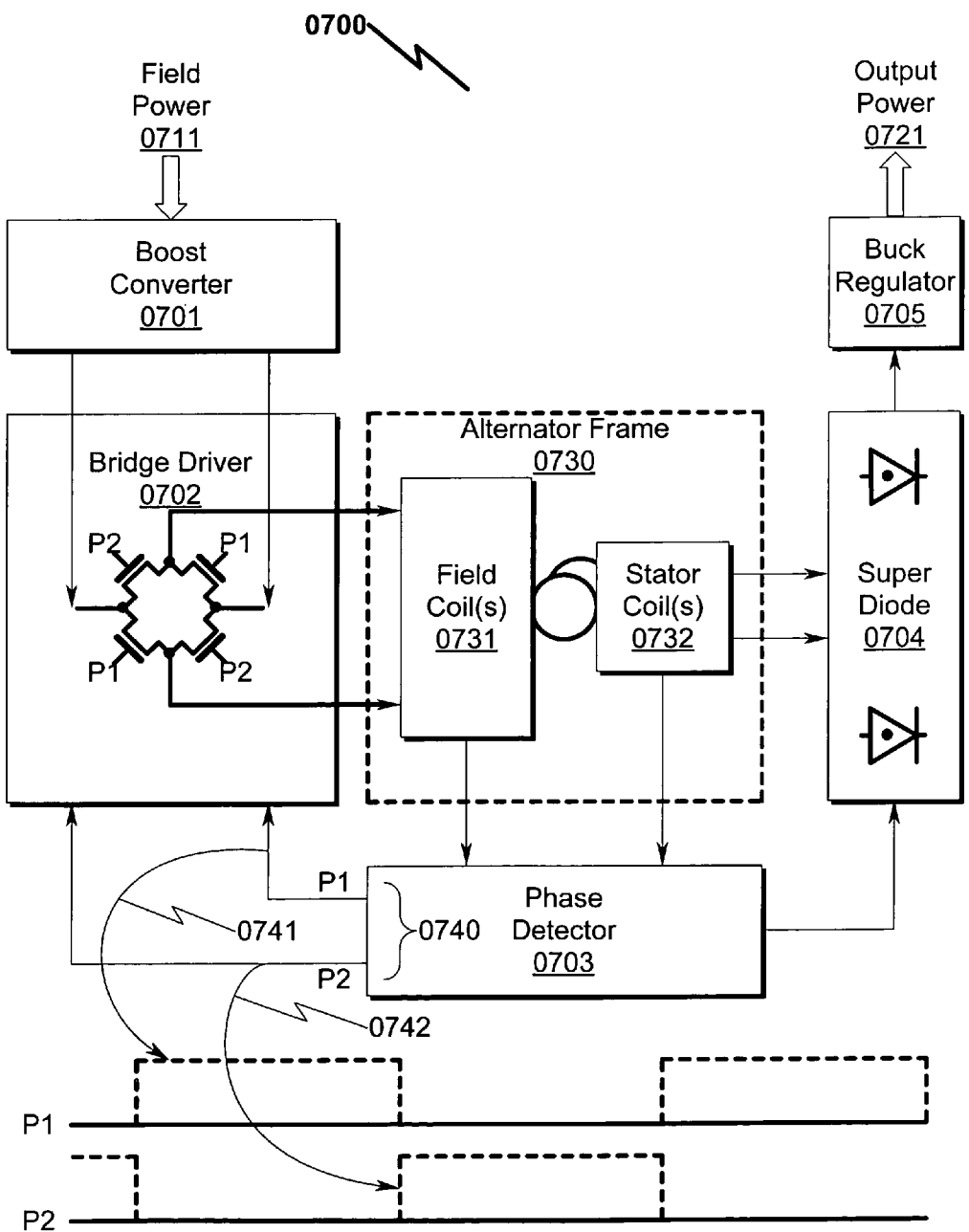
FIG. 7 illustrates a system level application block diagram of a preferred exemplary embodiment of the present invention.

The present invention may encompass many preferred embodiments, some incorporating a buck-boost topology as generally illustrated in the conceptual drawing of FIG. 7 (0700). The concept behind this approach is as follows. In order to reduce $I^2R$ power losses within the alternator field rotor and/or stator coil(s) and still meet overall power generation goals, the approach is to generally increase the operating voltage associated with the field rotor and/or stator coil(s) far above what is currently the norm in conventional alternator systems. By increasing the VOLTAGE at which the power generation system operates, the overall CURRENT flowing through stator conductors can be reduced proportionally to meet the required I-V power characteristic demanded of the system while simultaneously reducing the internal coil losses by the SQUARE of the current, assuming coil resistances are maintained as before. This reduction in internal power losses improves overall system efficiency and increases system reliability.

Figure 5:
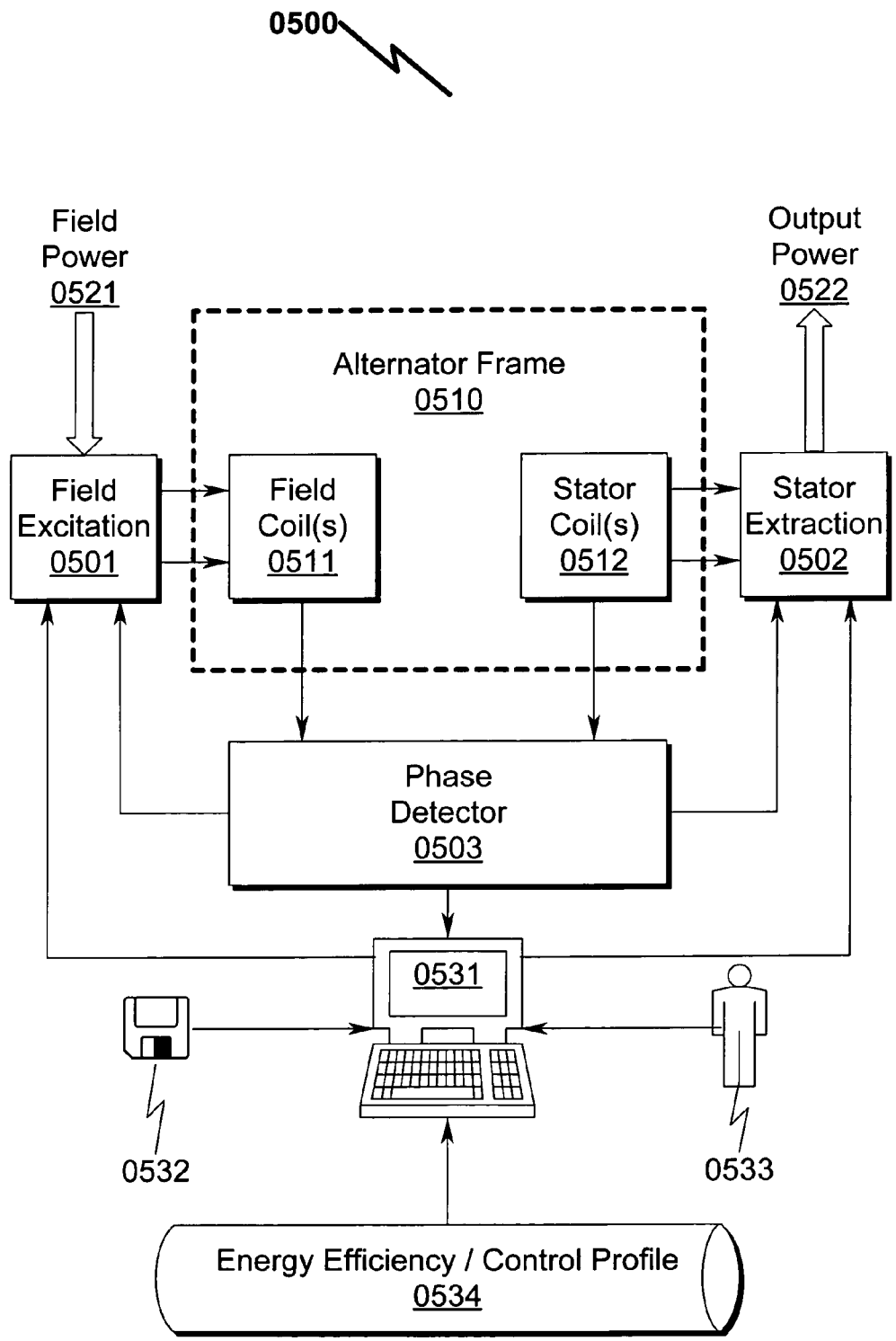
FIG. 5 illustrates a system level application block diagram of a preferred exemplary embodiment of the present invention.
Figure 6:
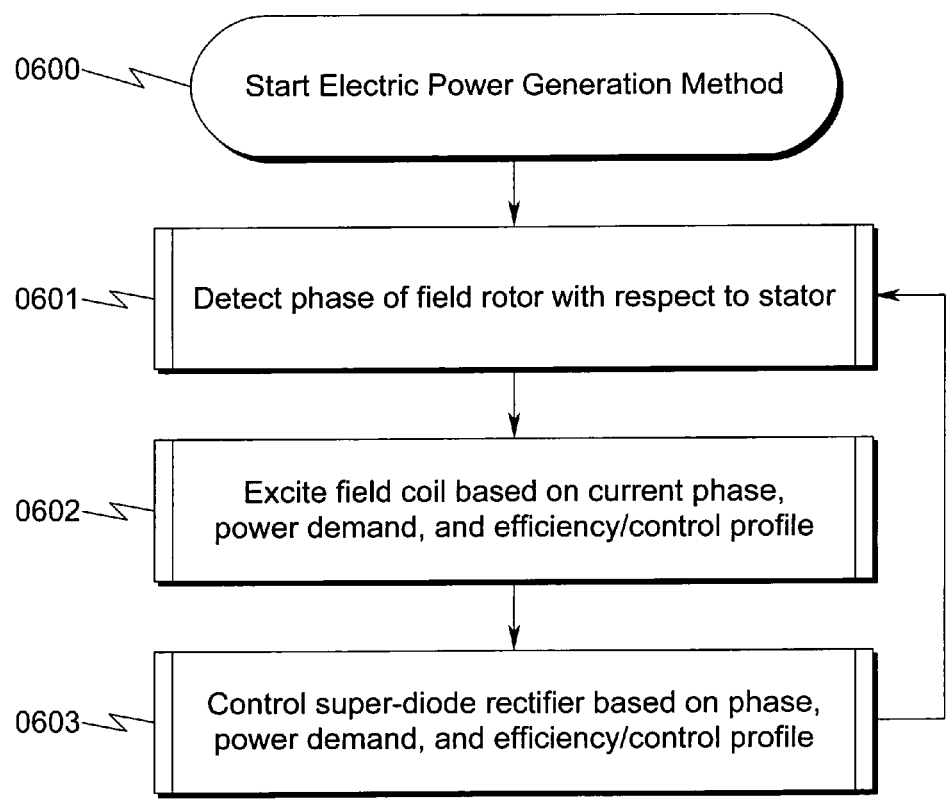
FIG. 6 illustrates a flowchart depicting a preferred exemplary embodiment of the invention method.

The present invention may be embodied in a preferred exemplary embodiment as generally illustrated in FIG. 7 (0700) wherein the field excitation subsystem components generally described in FIG. 5 (0501) comprise a boost converter (0701) and bridge driver (0702) that first boosts the voltage level associated with the field power source (FIG. 5 (0521)) before applying this voltage differentially (0702) to the field rotor coil(s) (0531, 0731) under control of a phase detector (0703) generating (optimally) non-overlapping P1 (0741)/P2 (0742) phase control signals (0740). Note that the use of a bridge driver (0702) (in conjunction with P1/P2 phase control signals from the phase detector (0703)) in this application automatically doubles the effective voltage applied to the field rotor coils due to the differential nature of the bridge. The induced stator coil(s) (0732) voltage is then rectified by super-diodes (0704) and regulated by a buck-boost converter (0705) before being presented to the output load (0721).

As generally illustrated in FIG. 7 (0700), this approach is accomplished by taking field power (0711) from a typically lower voltage source and utilizing a DC-DC BOOST converter (0701) and appropriate bridge driver circuit topologies (0702) to drive the alternator (0730) field rotor coil(s) (0731) with a much higher voltage than is currently conventional within traditional alternator-style power generation systems. This increased rotor field excitation results in a much higher stator coil (0732) output voltage. This stator coil output voltage is rectified (if necessary) by super-diode (0704) and fed into a BUCK-BOOST converter (0705) for application as output power (0721) to the remaining electrical system of the automobile/truck, etc. The addition of a back end BUCK-BOOST converter (0705) permits a wide range of stator coil output voltages to be available for conversion to an appropriate output voltage (0721) suitable for use with the loads tied to the electric power generation system. The present invention anticipates that some preferred exemplary embodiments may incorporate multiple buck and/or buck-boost regulators (0705) to support multiple power busses within an automobile/truck environment as well as supporting an independent feedback to the boost converter (0701) from the stator coil(s) (0732).

Augmenting the efficiencies obtained within this system are the use in some preferred embodiments of super-diodes (0704), or pass transistors in which the gate/base drive voltages/currents are derived from semiconductor control circuits to improve their overall on-resistance characteristics, making them far superior to conventional rectifier diodes, Shottkey diodes, and related AC rectification apparatus typically utilized within prior art rectifier subsystems. Further background information on this concept can be obtained from the Linear Technologies Corporation models LTC4352, LTC4354, LTC4355, LTC4356, LTC4357 classes of POSITIVE HIGH VOLTAGE IDEAL DIODE CONTROLLERS, datasheets of which are incorporated herein by reference.

An additional feature of this approach is that the field excitation of the field rotor coil(s) can be varied with time, and more specifically the phase of the rotor (0731) with respect to the stator (0732). This variable field rotor excitation permits the possibility in some preferred embodiments to eliminate the need for rectification of the stator coil (0732) output voltage, as inversion of the field rotor (0731) voltage if timed properly with the rotor/stator phase can result in pulsed DC at the output of the stator coil(s). This pulsed DC can be fed directly into a BUCK-BOOST regulator system (0705) capable of providing a nominal DC output voltage over a wide range of engine RPM and/or system loading conditions.

While the present invention does not limit the scope of construction of the bridge driver circuitry (0702), anticipated within the context of the present invention for many preferred embodiments is the utilization of super-diode technologies within the bridge driver (0702) subsystem to minimize power losses in driving the field coil(s) (0732). (Note here that the super-diode "enable" control signal (see FIG. 12 (1230)) corresponds to the MOSFET gate control illustrated in FIG. 7 (0702)). Additionally, it should be noted that rectification of the stator coil(s) (0732) output by the super-diodes (0704) may not be necessary in some scenarios where the phase detector generates proper P1 and P2 non-overlapping excitation phases for the differential bridge driver (0702) circuitry.

Buck-Boost Method Summary (0800)

Figure 8:
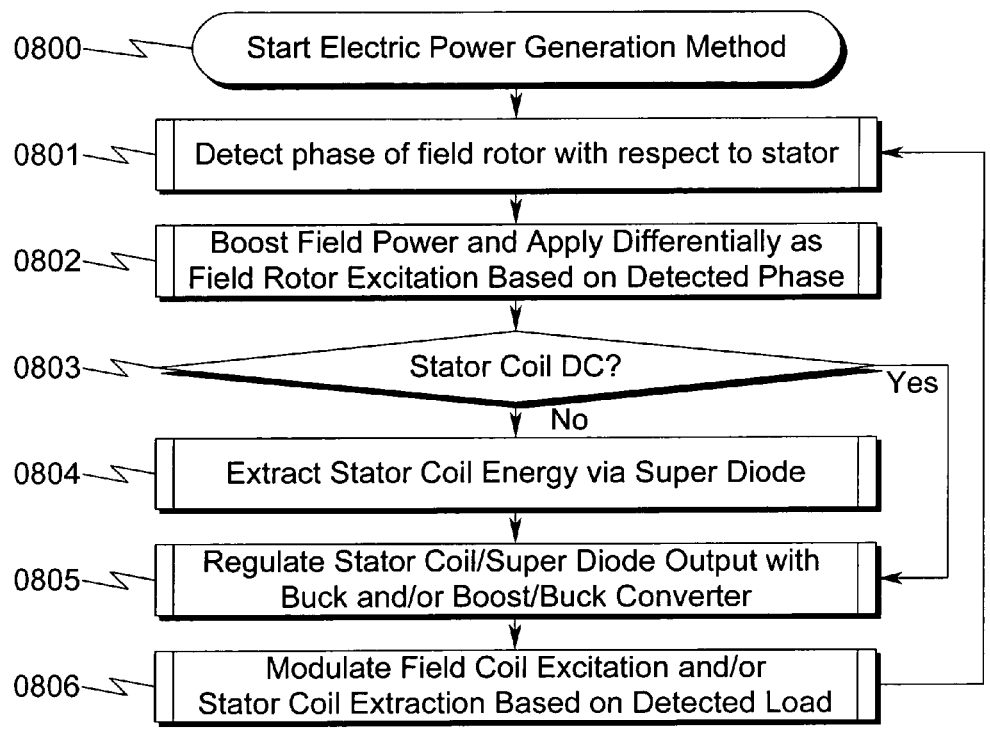
FIG. 8 illustrates a flowchart depicting a preferred exemplary embodiment of the invention method.

The present invention method associated with the above described buck-boost system can be generally illustrated by the preferred exemplary embodiment illustrated in FIG. 8 (0800). The general steps of this method comprise the following:

Determining the phase relationship between the field rotor coil(s) and the stator coil(s) (0801);
Boosting the field power source and applying this power differentially as field rotor excitation based on the detected field/stator phase (0802);
Determining if the stator coil voltage is DC, and if so proceeding to step (5) (0803);
Extracting stator coil energy via super diode structures (0804);
Regulating the stator coil/super diode output with a buck and/or buck-boost converter (0805);
Modulating the Field Coil Excitation and/or Stator Coil Extraction Based on Detected Load (0806); and
Proceeding to step (1) to repeat the method control loop for the power generation system.

This general method as illustrated in FIG. 8 (0800) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Super-Diode Rectification

Super-Diode Differential Bridge Excitation/Bridge Rectification (0900)

Figure 9:
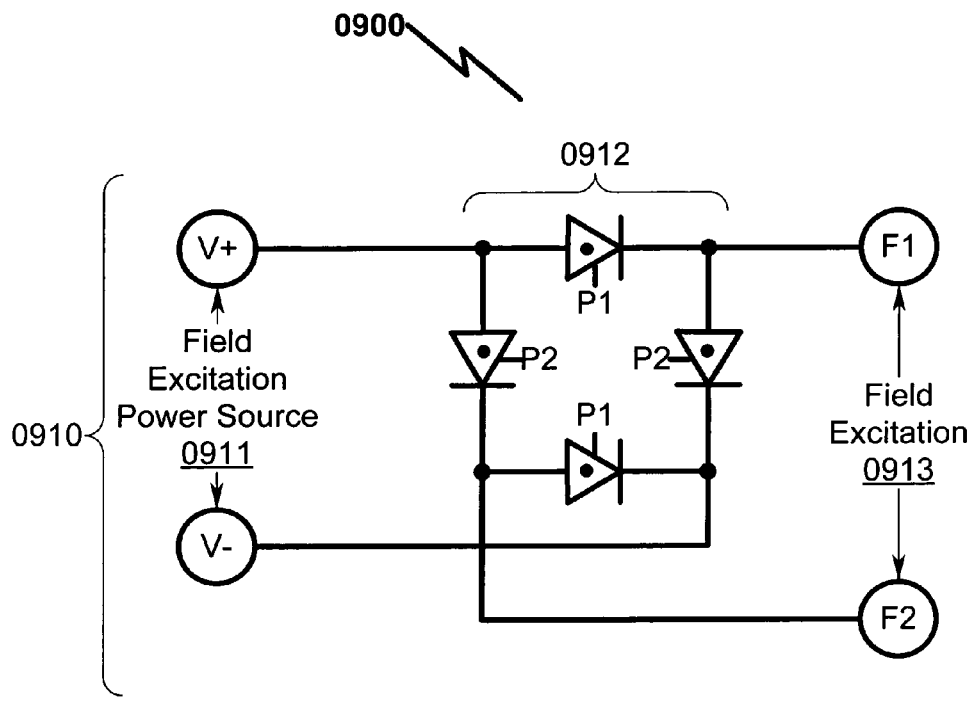
FIG. 9 illustrates various bridge driver/rectifier topologies used in some preferred exemplary embodiments of the present invention.
Figure 9:
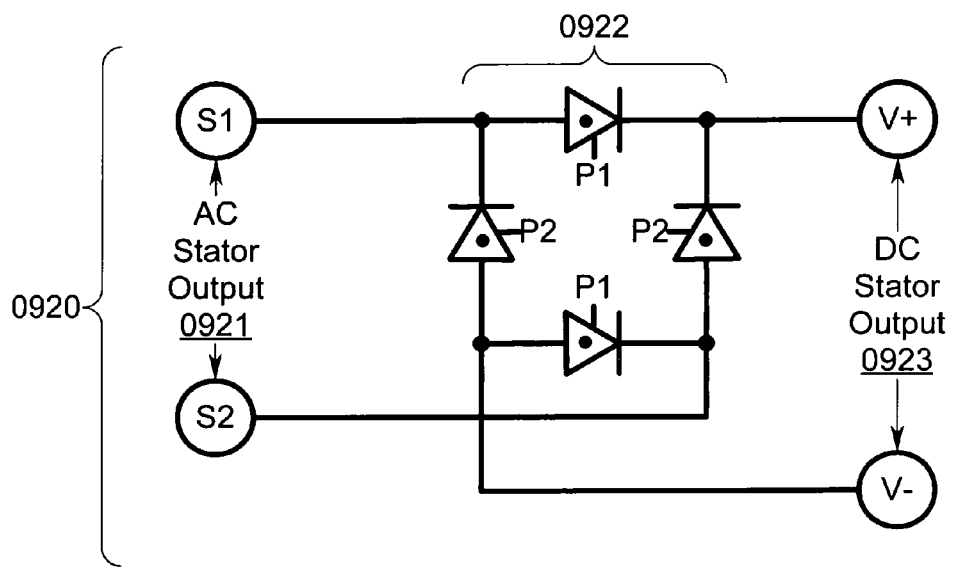

Various preferred exemplary embodiments of the present invention may make use of differential bridge excitation and/or bridge rectification using super-diode structures (detailed below) as generally illustrated in FIG. 9 (0900). Within this context, the field coil(s) may be excited differentially using structures equivalent to (0910) wherein the field excitation power source (0911) is switched through a super-diode bridge (0912) under control of differential phase signals (P1/P2) to produce a differential field excitation output (0913). Similarly, a super-diode bridge rectifier (0920) may be utilized that takes the stator coil(s) output (0921) and rectifies this through a super-diode bridge (0922) to produce a DC stator output (0923) that may be further processed by a DC-DC converter (buck-boost, buck, etc.). Within this context the P1/P2 phase control signals are utilized to ensure that the super-diodes operate as rectifiers (and not mere switches) in conjunction with the phase detection circuitry that monitors the phase relationship between the field rotor coil(s) and the stator coil(s).

Silicon/Schottky Diode Rectifiers (1000)

Figure 10:
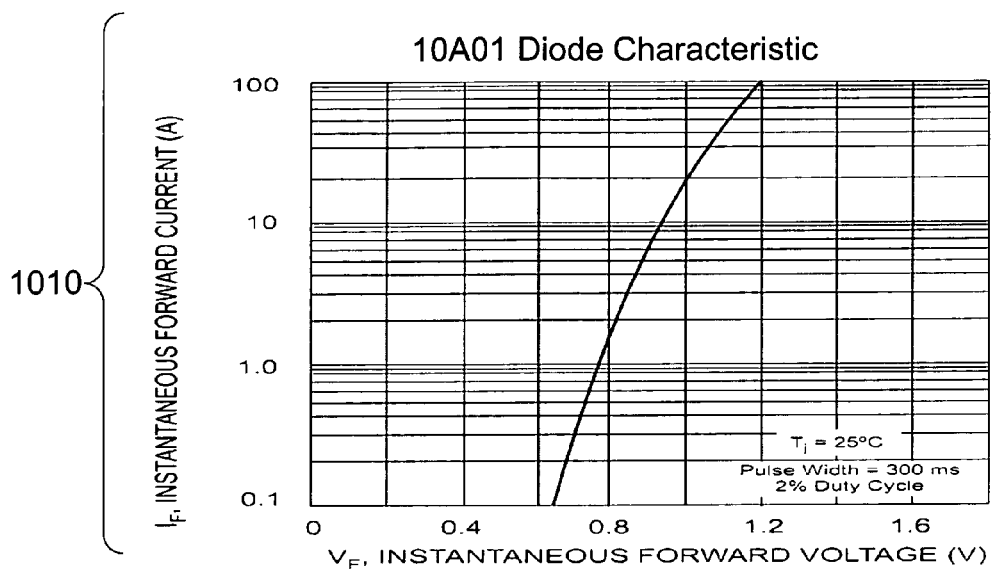
FIG. 10 illustrates a typical IV characteristic for a prior art 10A01 silicon rectifier and a typical IV characteristic for a prior art VISHAY SEMICONDUCTOR model MBR10100 Schottky rectifier.
Figure 10:
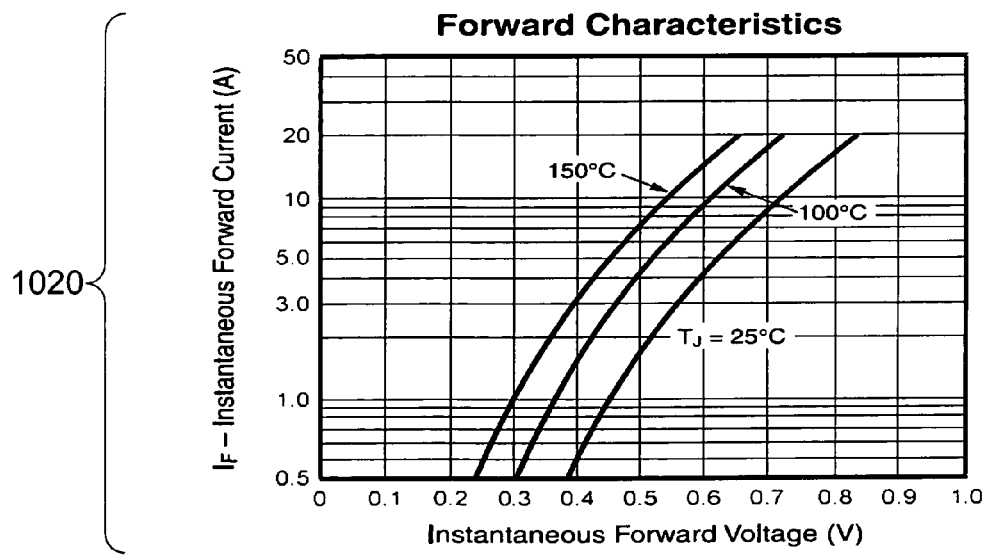

General purpose silicon diode rectifiers are well known in the prior art and are generally described as having an exponential current/voltage (I-V) characteristic and thus relatively constant forward "ON" voltage as generally illustrated in FIG. 10 (1000) graph (1010). Under most normal conditions, the forward voltage drop across a silicon diode ranges from 0.6V to 1.0V as generally illustrated in FIG. 10 (1010). In this example, a typical 10A current draw would result in a forward diode drop of more than 0.9V.

This forward voltage drop results in significant power loss due to heat dissipation within the rectifier element as currents through the device are increased. For example, at 10A current flow, the diode in FIG. 10 (1010) dissipates in excess of 9W of power just due to the forward voltage drop across the diode. In high power generation systems such as automobile/truck alternators, this power dissipation can exceed 100 W and result in significant overall system inefficiencies as well as reduced reliability due to increased heat dissipation.

Modern power rectifier systems have migrated to the use of power Schottky diodes that have lower forward voltage drops as generally illustrated in FIG. 10 (1000) graph (1020). In this example, the forward voltage drop is approximately 0.725V for an equivalent 10A load current. This results in an approximate 20% reduction in power dissipation within the power rectifier, a significant power efficiency improvement.

Power MOSFETS (1100)

Figure 11:
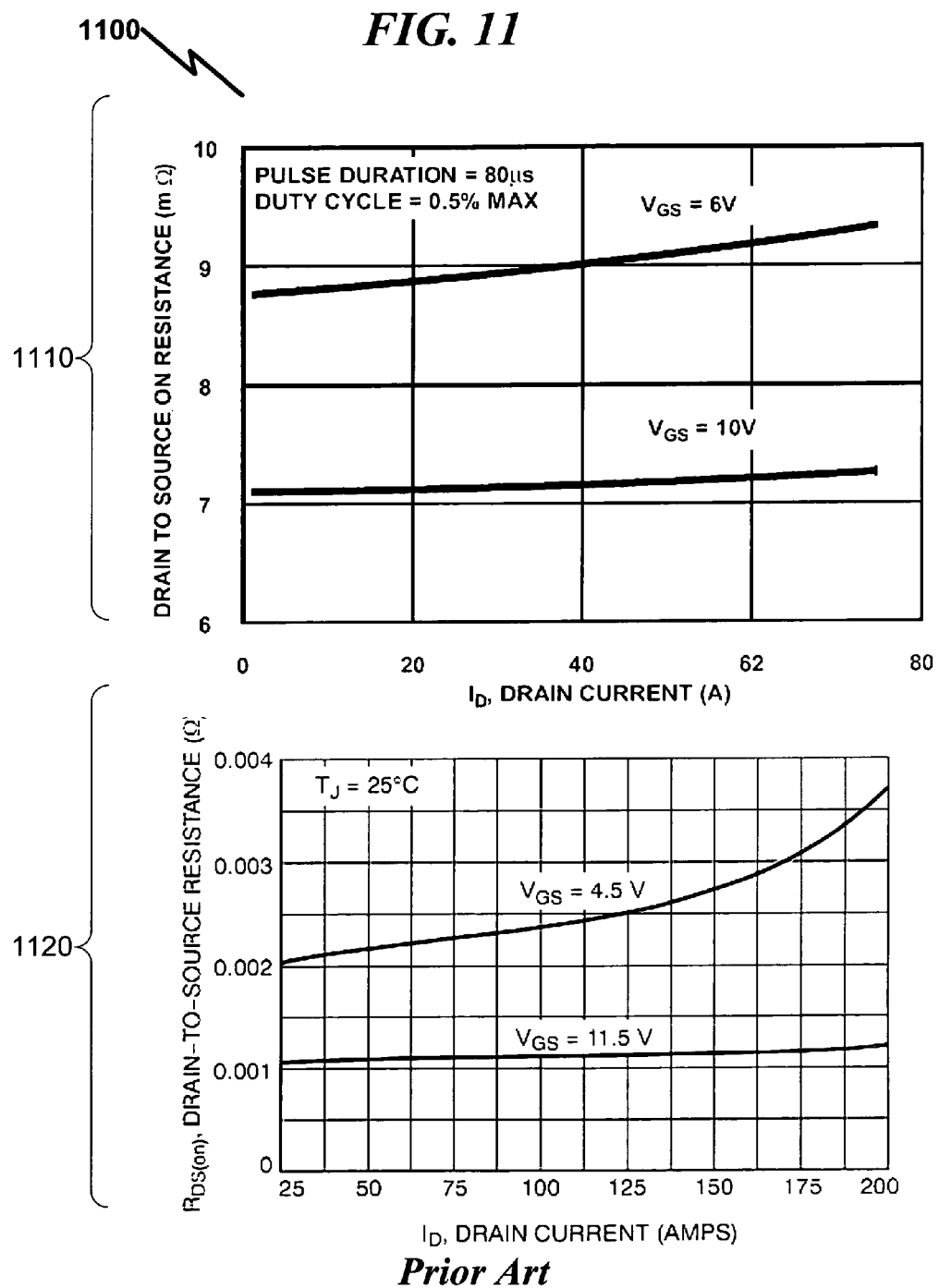
FIG. 11 illustrates a typical ON resistance characteristic for a prior art FAIRCHILD model FDB3632 power MOSFET and a typical ON resistance characteristic for a prior art ON SEMICONDUCTOR model NTMFS4833N power MOSFET, these devices being typical of those suitable for use in some preferred embodiments of the present invention.

In contrast to traditional silicon/Schottky diodes, modern power MOSFETs may in many instances have relatively flat conduction resistances. In other words, the I-V characteristic is more linear than exponential, resulting in lower overall power losses in the system as compared to equivalent silicon/Schottky diodes. As generally illustrated by the I-V curves in FIG. 11 (1100), a typical power MOSFET may have an ON resistance of less than 0.010 ohms (1110), and in many circumstances with proper gate drive potentials this ON resistance may approach 0.001 ohms (1120).

Super-Diode Configuration (1200)

Figure 12:
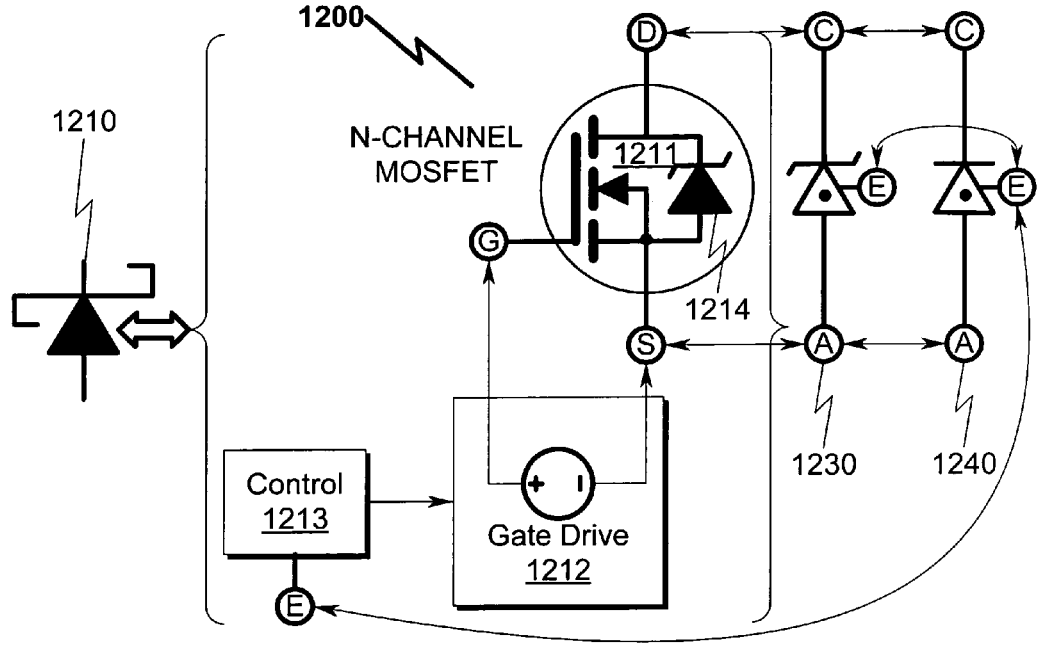
FIG. 12 illustrates the substitution of a Schottky diodes rectifier by a functional model of a MOSFET based super-diode used in some preferred embodiments of the present invention.
Figure 12:
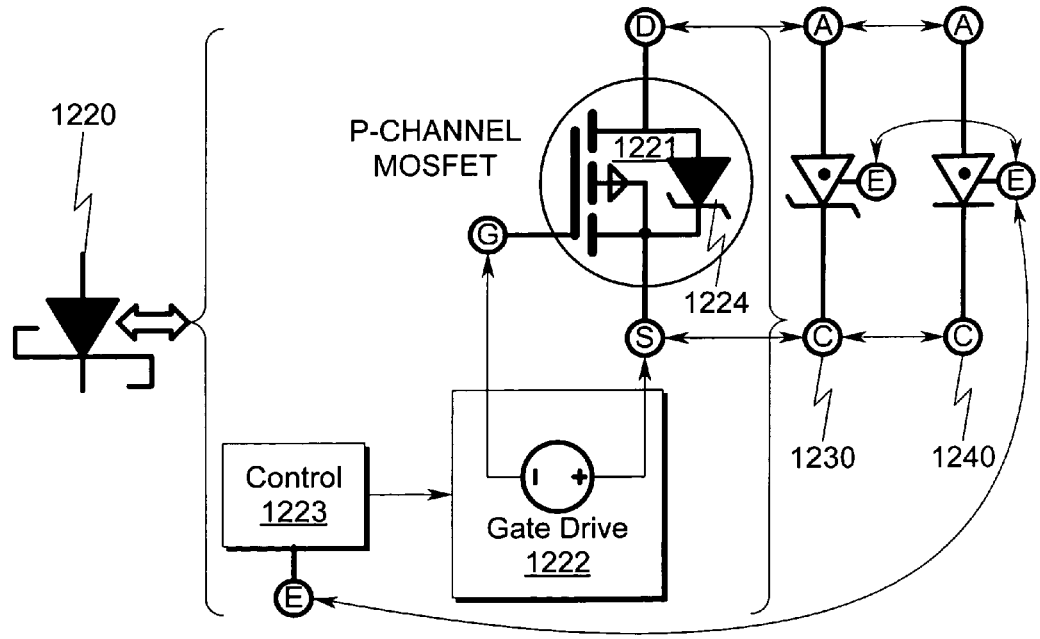

An improvement over conventional silicon rectifiers and Schottky diodes can be achieved using super-diode configurations as generally illustrated in FIG. 12 (1200). Here the conventional silicon/Shottkey diode rectifier (1210, 1220) is replaced by a power MOSFET (1211, 1221) with auxiliary gate drive (1212, 1222) that provides the necessary positive gate drive voltages for N-CHANNEL or P-CHANNEL MOSFET devices to turn on the MOSFET (1211, 1221). Modifications to the gate drive circuitry (1212, 1222) can also accommodate P-CHANNEL MOSFET devices by simply reversing the polarity of the generated gate drive voltage (1212, 1222). These gate drive voltages are typically generated via the use of charge pump circuitry, using the source voltage as the virtual "ground" of the voltage created.

The system may be augmented with additional control circuitry (1213, 1223) to determine when the MOSFET (1211, 1221) is activated and when the MOSFET (1211, 1221) current conduction capability is disabled. Note that the exemplary MOSFET configuration illustrated in FIG. 12 (1211, 1221) makes use of the internal drain-source zener diode within the MOSFET (1211, 1221). By doing so it permits some forward conduction even when the gate drive circuitry (1212, 1222) and/or control circuitry (1213, 1223) are inactive/disabled.

While the use of embedded diode structures (1214, 1224) within the MOSFET is advantageous in some preferred exemplary embodiments of the present invention, this technique is not an essential element of the present invention. Additionally, note that in situations where the internal diode structure is not present, the MOSFET is essentially a symmetric structure, permitting reversal of the drain and source connections in many MOSFET configurations with no loss of generality in the super-diode concept.

Within the context of the present invention the super-diode construct (with optional embedded diode structures (1214, 1224)) may generally be illustrated using the depicted nomenclature (1230), with the modified super-diode symbol having conventional Anode (A) and Cathode (C) diode connections with an additional Enable (E) connection to depict control circuitry (1213, 1223) inputs unless these inputs are omitted as being clear from the context of the schematic. Similarly, within the context of the present invention the super-diode construct (absent embedded diode structures (1214, 1224)) may generally be illustrated using the depicted nomenclature (1240), with the A/C/E connections as described above.

Generalized Super-Diode Schematic (1300)

Figure 13:
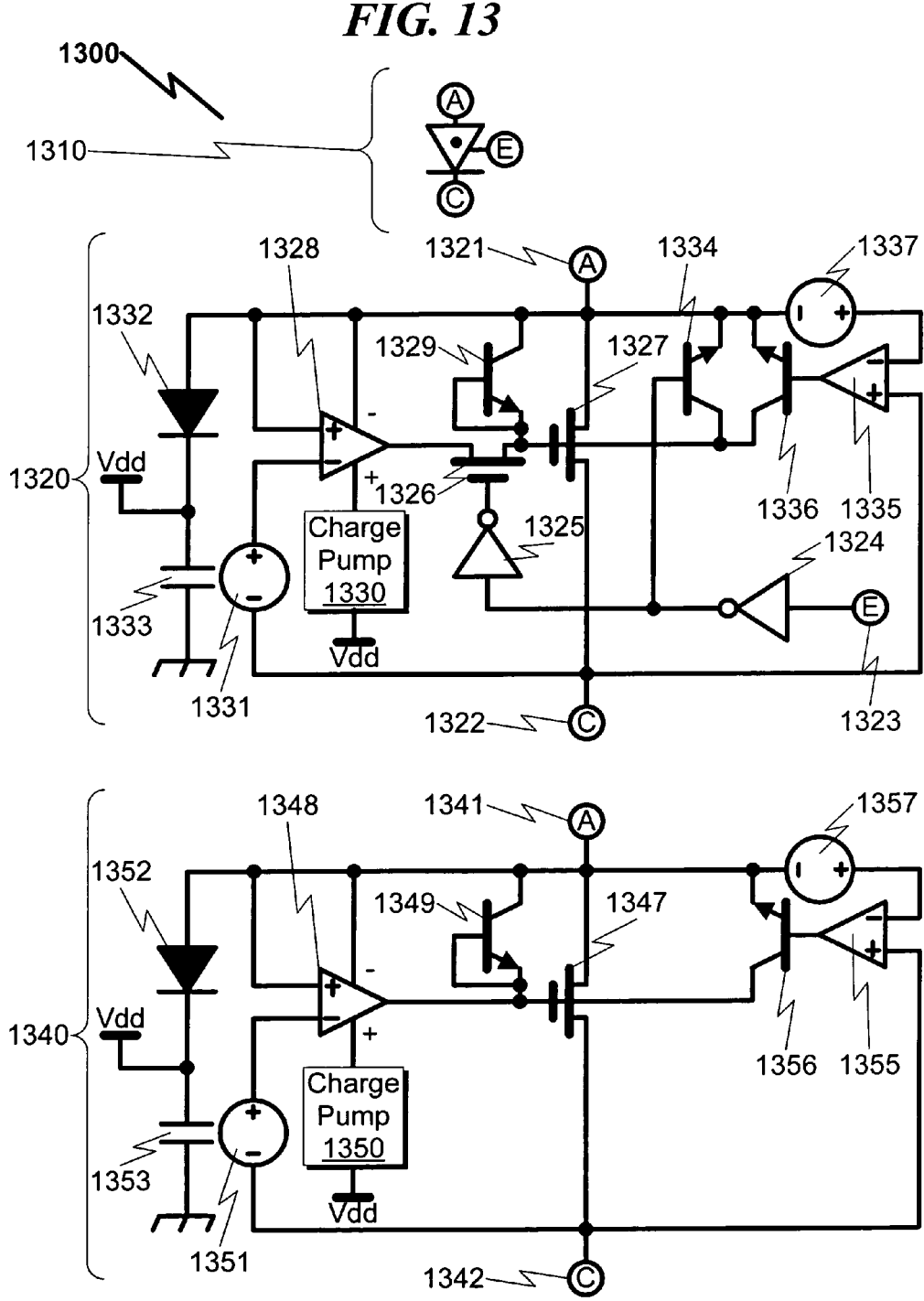
FIG. 13 illustrates an exemplary implementation of the super-diode control circuitry used in some preferred exemplary embodiments of the present invention.

Many preferred exemplary embodiments of the present invention will utilize a super-diode equivalent based on the generalized schematic diagram of FIG. 13 (1300). This illustrates the abstracted three terminal super-diode (1310) with traditional Anode (A) (1311), Cathode (C) (1312), and Enable (E) (1313) terminals which mimic the corresponding Anode (A) (1321), Cathode (C) (1322), and Enable (E) (1323) signals on the equivalent schematic (1320). Note that the Enable (E) (1313, 1323) may be omitted in situations where the super-diode is always enabled for forward rectification. The use of the Enable (E) (1313, 1323) embodiment will generally be indicated in situations where rectification is controlled by the phase detector circuitry detailed elsewhere in this document. One skilled in the art will recognize that some elements of the schematic (1320) may be omitted in this scenario for simplicity of construction.

With respect to the schematic (1320), the Enable (1323) signal is buffered (1324, 1325) to provide gate drive for a pass device (1326) that drives the gate of a power MOSFET (1327) from a comparator (1328) with optional gate drive surge limiting (1329). The gate drive comparator (1328) is powered by a charge pump (1330) taking its power from the Anode connection (1321) via a suitable power source (1332) and filter (1333). One skilled in the art will recognize that the charge pump (1330) and supply circuitry (1332, 1333) may vary widely in implementation and that the illustrated circuit is only one exemplary method of implementing the gate drive voltage for the pass MOSFET (1327). In some preferred embodiments the charge pump may be a common circuit that supplies gate drive voltage for a number of super-diode sub-circuits. The voltage source (1331) is typically less than 100 mV and serves to ensure that a minimum voltage drop is achieved across the pass MOSFET device (1327).

The gate drive MOSFET (1326) serves to enable gate drive to the pass device (1327). When the Enable (1323) signal is inactive (low), inverter (1324) drives shunt transistor (1334) to disable gate drive to the pass transistor (1327). Similarly, any reverse voltage detected between the Anode (1321) and Cathode (1322) terminals is detected by comparator (1335) which enables shunt device (1336) to remove gate drive from the pass device (1327). Optional voltage source (1337) (typically less than 100 mV) sets the voltage threshold for reverse voltage shutdown of the pass device (1327) via shunting transistor (1336).

One skilled in the art will recognize that the elements in the schematic (1320) may be inverted in sense, with substitutions of P-channel for N-channel, PNP for NPN, etc. with no loss of generality in the teachings of the present invention. Additionally, as stated previously, if the Enable (E) (1323) signal is not required, then inverters (1324, 1325) and shunt device (1334) are not needed and gate drive device (1326) may be replaced with a short, resulting in the equivalent schematic illustrated generically as (1350).

Present Invention Approach and Potential Enemy Savinas (1400)

Figure 2:
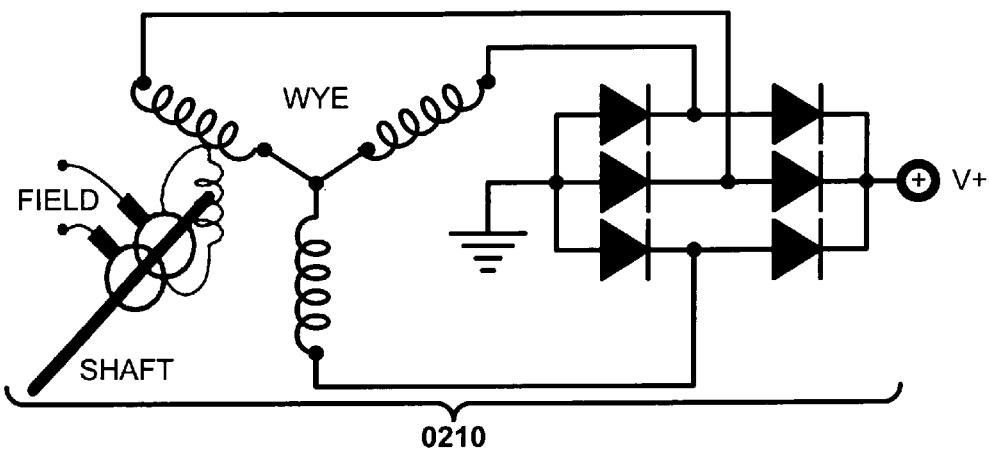
FIG. 2 illustrates conventional prior art polyphase alternator-based electric power generation systems.
Figure 2:
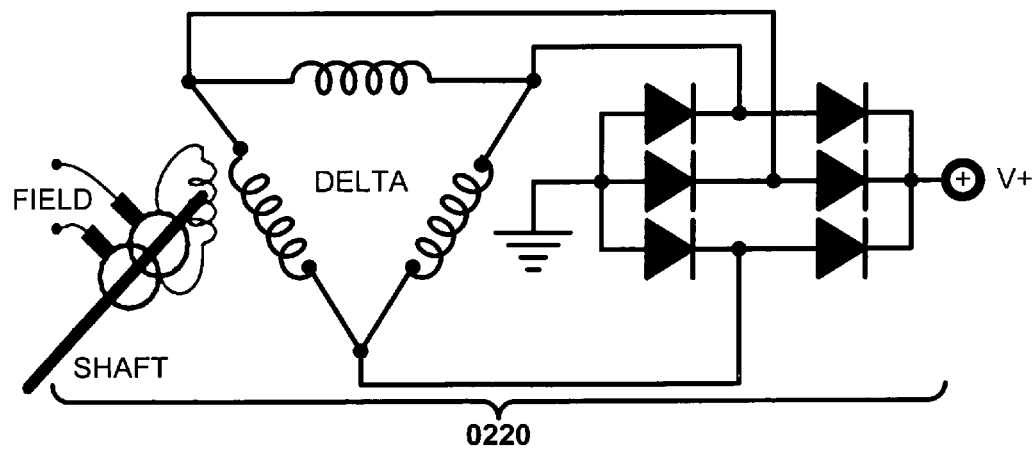

Many preferred exemplary embodiments of the present invention break with tradition in prior art alternator designs by utilizing "super-diodes" in areas of switching and AC rectification that are traditionally handled by power rectifiers or Schottky diodes. As generally illustrated in FIG. 2 (0200), the traditional Wye (0210) and Delta (0220) configurations suffer from a significant deficiency in that the rectification of AC voltage from the stator coil(s) must be performed using two series connected diode rectifiers. While these diodes possess an exponential I-V characteristic, they generally do have a relatively constant forward voltage drop, resulting in significant power dissipation within these devices as the load current is increased. For example, for a 0.6V forward diode drop and a load current of 50A, the system dissipates 60W within the two-diode series string. In contrast, modern power MOSFETs can exhibit RDS(on) drain-source resistances on the order of 0.001 ohms, resulting in a power dissipation of 3W in, this example, a 95% reduction in rectifier power dissipation.

Figure 14:
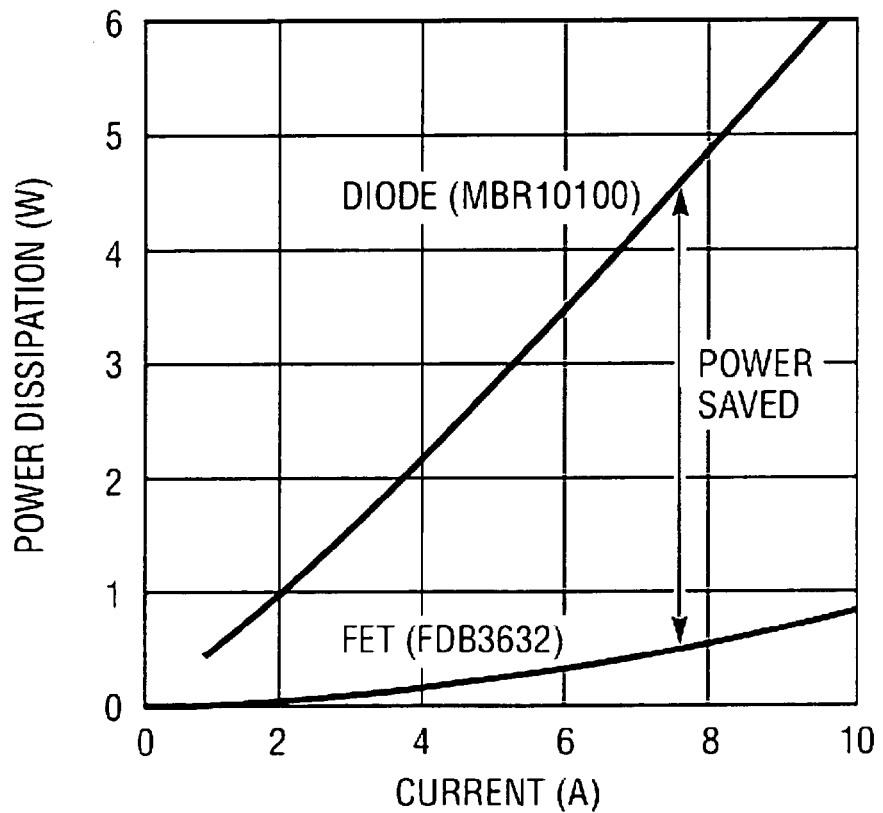
FIG. 14 illustrates an exemplary example of power saved using a super-diode configuration taught by some preferred exemplary embodiments of the present invention.

This example does not account for the fact that while the I-V characteristic of the rectifier diode is exponential, the forward diode approximation is just that, an approximation. FIG. 14 (1400) is a more realistic display of the potential differential between a power rectifier and power MOSFET switch used as a rectifier. This example, derived from a LINEAR TECHNOLOGY CORPORATION model LTC4357 class of POSITIVE HIGH VOLTAGE IDEAL DIODE CONTROLLERS illustrates that even with modest performing power MOSFETs (such as those possessing the ON resistance characteristics of FIG. 11 (1100)), the reduction in power dissipation at high current loads can easily approach a factor of eight (8) or greater.

Application to Conventional Alternator Topology

Figure 3:
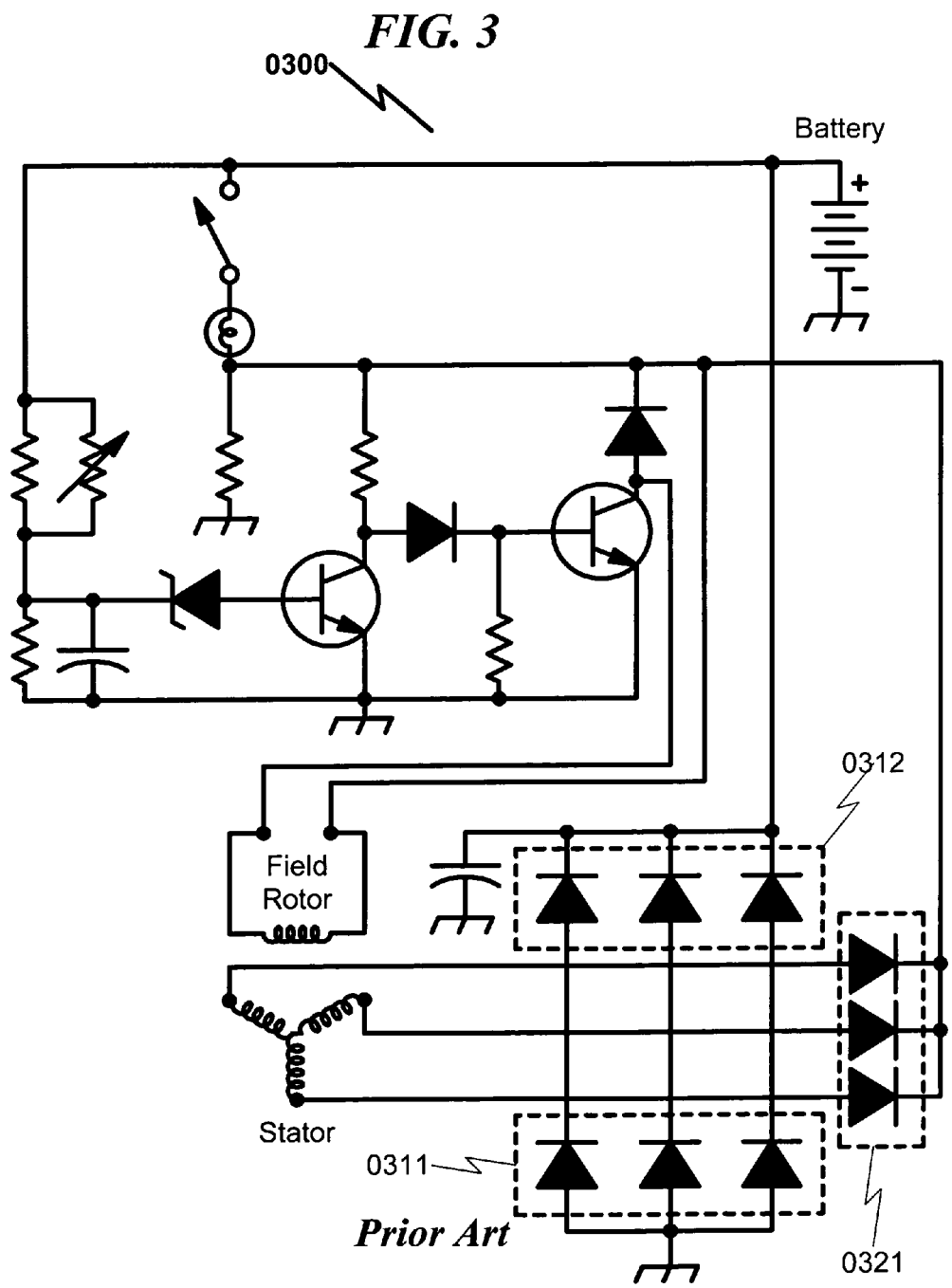
FIG. 3 illustrates a conventional prior art polyphase alternator-based electric power generation system schematic.
Figure 4:
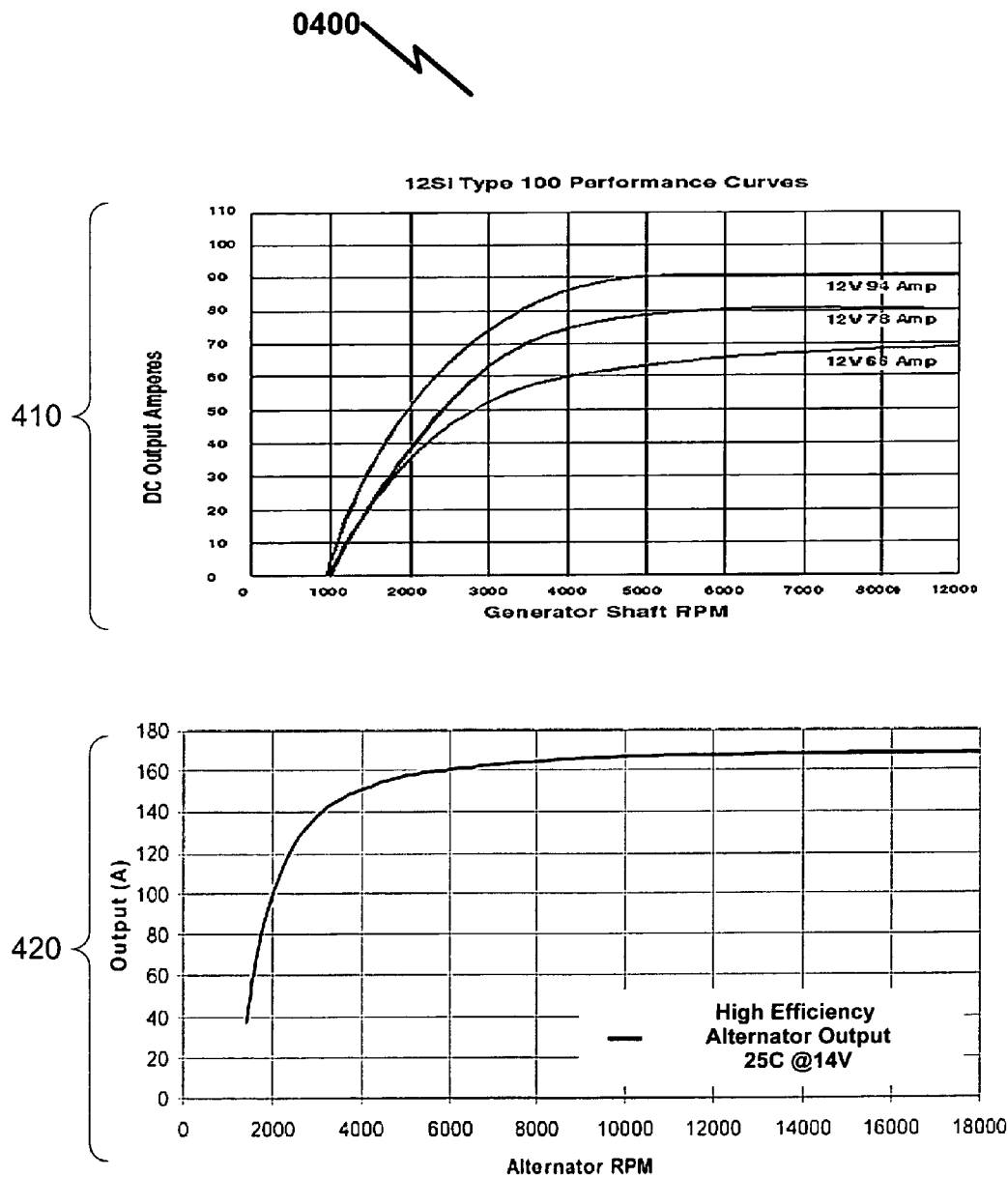
FIG. 4 illustrates a typical power generation characteristics of the prior art alternator-based electric power generation system of FIG. 3.

The replacement of traditional silicon/Schottky rectifier diodes with super-diodes can be applied to conventional alternator topologies as generally illustrated in FIG. 3 (0300), wherein the rectifier diode bridge elements (0311, 0312) and supply bridge (0321). However, without proper control circuitry (1213, 1223) the results will not necessarily be desirable, as the switch-off times for these super-diode configurations are not necessarily comparable to that of conventional diode rectifiers. The present invention solves this problem by integrating phase control into the super-diode control circuitry (1213, 1223) to ensure conduction of the super-diode only when the diode structure should be logically forward-biased.

Exemplary Application: Diesel Truck Alternator Fuel Savings

One preferred exemplary embodiment application of the present invention is in the area of automobile/truck alternator systems, and specifically diesel truck alternator systems. In these environments, the typical alternator is rated from 100-270A DC, and is operated from 2× to 3× (or higher) than the typical rotational speed of the engine. This typically places a strain on the mechanical components associated with the alternator (bearings, shaft, lubrication, etc.). These stresses in addition to the high level of heat in this environment usually result in reduced reliability and longevity for alternators in this environment.

In this environment a significant fuel savings can be realized by use of the teachings of the present invention. For example, utilization of super-diodes as the rectification agent within the stator extraction subsystem can result in approximately 0.6 W/A of delivered current by the stator extraction subsystem as generally illustrated by the relative power dissipation curves shown in FIG. 14 (1400). Thus, for a typical diesel alternator subsystem delivering 100A of current, 60W of power savings can be realized by using the super-diode techniques taught by the present invention. For this typical system the overall power delivery is approximately 1400W (assuming 14V voltage delivery), meaning that the integration of super-diodes in this configuration produces approximately a 4.3% increase in overall alternator efficiency.

Based on data from BOSCH model LONG HAUL ALTERNATORS a 1% improvement in alternator efficiency can result in a savings of approximately 4.5-6.0 gallons of diesel fuel per year per truck (depending on average speeds ranging from 25-45 MPH), assuming 100,000 miles per truck per year. Thus, if we assume a nominal savings of 5.25 gallons per truck per year using the present invention, a total savings of 22 gallons per truck (4.3%*5.25 gal/%) is nominally attainable. The Federal Bureau of Transportation Statistics (www.bts.gov) from 2008 indicates roughly 250 billion truck miles driven per year in the United States. A savings of 22 gallons per truck per 100,000 miles would result in approximately 50 million gallons of diesel fuel saved utilizing the teachings of the present invention. This fuel would have cost in excess of $200 million USD at current diesel pricing. Similar analysis performed with respect to gasoline powered highway transportation within the United States results in a total of approximately 2.7 trillion miles traveled in 2008, with a corresponding savings of 600 million gallons of fuel in a given year, or approximately $2 billion USD at current fuel pricing levels.

General System Architecture (1500)

Figure 15:
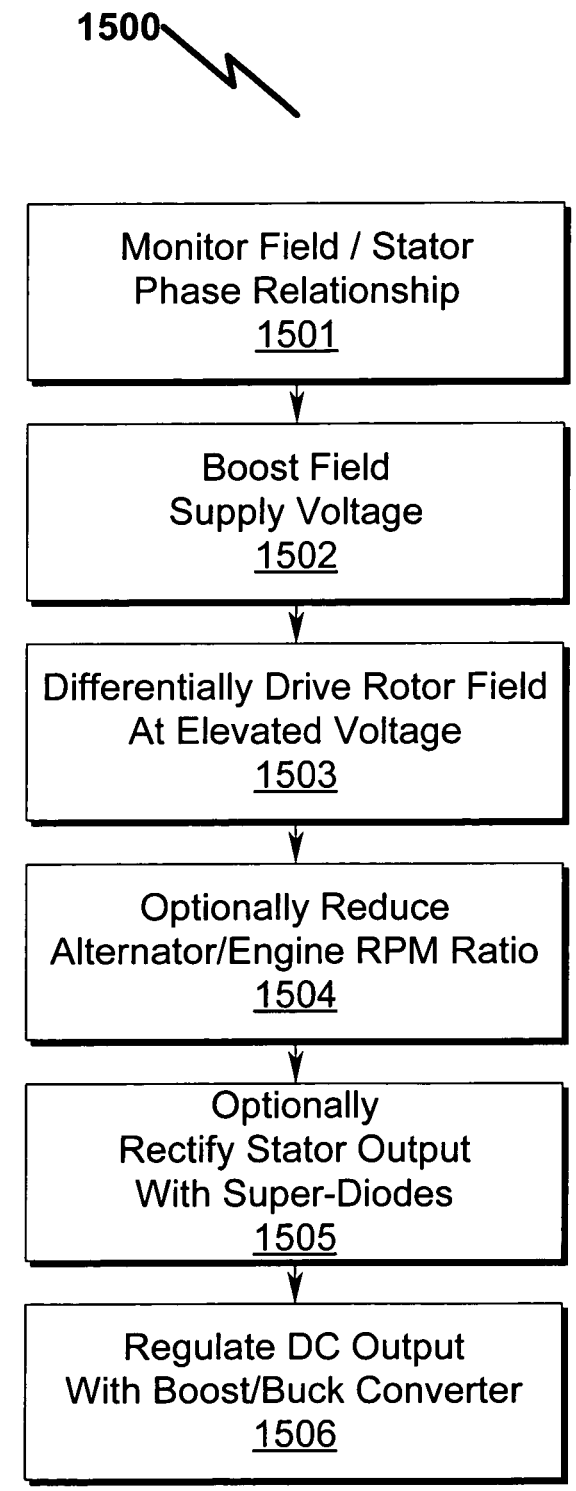
FIG. 15 illustrates an exemplary system diagram describing the elements comprising some preferred exemplary embodiments of the present invention.

The previous discussion lays the foundation of the generalized system architecture for many preferred exemplary embodiments of the present invention as generally illustrated in FIG. 15 (1500). In this exemplary system embodiment, the key system components are as follows:

- Monitoring the phase relationship between the rotor and stator (1501). The present invention excites the rotor based on the instantaneous phase relationship between the rotor and stator, unlike prior art topologies that do not take the phase relationship between these elements into account when excitation of the rotor is actuated.
- Boosting the field supply voltage (1502). Rather than use conventional 12/24V batteries to supply the required voltage for the field rotor excitation, a boost converter is utilized to elevate the field voltage over that supplied by the battery. Many preferred exemplary embodiments of the present invention would utilize 48 VDC or even higher voltages at this juncture. The rationale for this is by increasing the voltage applied to the field rotor, the current can be increased proportionally while significantly reducing $I^2R$ power losses within the windings of the stator coil(s).

Differentially driving the field rotor at an elevated voltage (1503). By driving the field rotor differentially at elevated potential, the present invention precisely defines the magnetic field presented to the stator coils based on the phase relationship between the rotor and stator. This differential drive also doubles the effective voltage seen by the rotor field in comparison to conventional field rotor excitation by traditional alternators.

Optionally reduce the alternator/engine RPM ratio (1504). Many preferred exemplary embodiments of the present invention will be applied to scenarios where the pulley ratio between the engine and alternator will be less than 2:1 (or typically less than the prior art pulley ratio that is typically 2:1 or greater). This optional configuration reduces the alternator RPM without loss of power output because the enhanced field excitation more than compensates for low alternator output at low alternator RPM. Thus, an alternator using the teachings of the present invention can produce output power similar to that of the prior art but run at a fraction of the prior art alternator RPM. This reduces wear on the alternator, increase longevity and reliability, and increases alternator efficiency at higher RPM by reducing rotational losses at these higher engine RPM values. Note also that since the engine power required to drive the alternator fan increases as the CUBE of the alternator RPM value, decreasing the alternator RPM value can have a significant impact on the engine load by the alternator even if the alternator is not producing electricity. The goal in these circumstances would be to utilize low engine RPM to perform battery charging functions when possible, and reducing or eliminating alternator activation at higher engine RPM values. Since engine idle and low RPM is inefficient at increasing overall fuel economy, the use of these conditions for battery charging results in increased overall fuel economy.

Optionally rectify the stator output using super-diodes (1505). Rather than use conventional silicon/Schottky diodes for stator rectification, power extraction from the stator is initially accomplished using super-diodes that may be optionally controlled by the phase relationship monitored between the rotor and stator (1501). Note that in some preferred embodiments the phase relationship of the field rotor excitation with respect to the stator permits this rectification step to be omitted, and as such it is optional depending on system configuration.

Regulate the DC output from the super-diodes using a buck-boost and/or buck converter (1506). The present invention anticipates that the output of the super-diode rectification (1505) can vary widely in voltage value and available power (voltage*current). The use of a buck-boost and or buck converter as the interface between the rectification stage (1505) and the output power connection of the overall system permits a wide range of voltage/current combinations to be accommodated to squeeze/extract energy from the stator coil and place this on the output power bus of the system. The use of elevated field excitation voltages generally provides for elevated stator coil voltages that can be buck converted to provide for a stable output bus voltage irrespective of alternator and/or engine RPM.

Each of the above generalized system elements may incorporate a wide variety of embodiments. Additionally, some elements may be omitted in some preferred embodiments depending on system requirements and overall system construction.

Alternate General System Architecture (1600)

Figure 16:
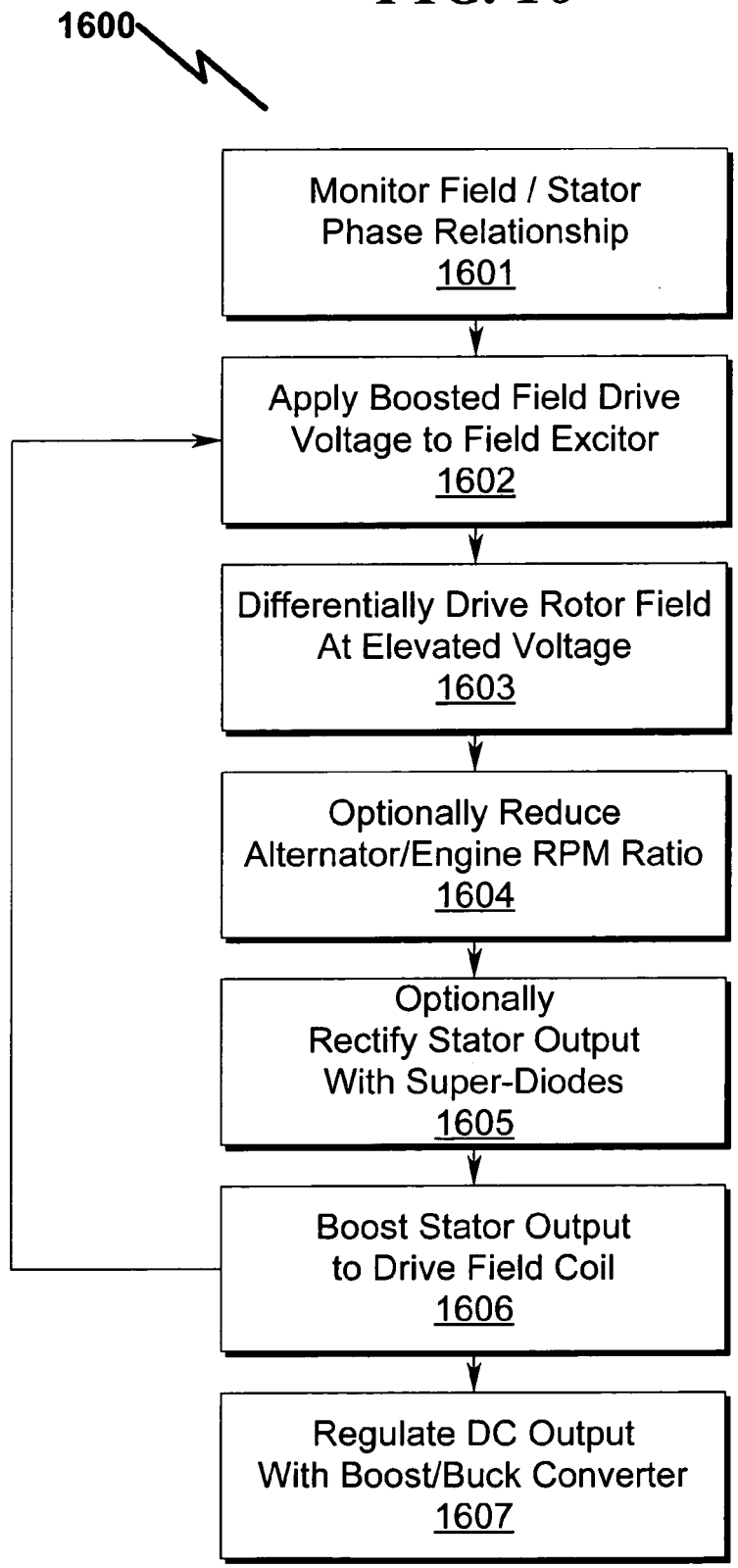
FIG. 16 illustrates an exemplary system diagram describing the elements comprising some preferred exemplary alternate embodiments of the present invention.

The previous system embodiment example may also be modified as generally illustrated in FIG. 16 (1600). In this exemplary alternate system embodiment, the key system components are as follows:

Monitoring the phase relationship between the rotor and stator (1601), as described above (1501).

Applying a boosted field drive voltage to field exciter (1602). This embodiment utilizes a boosted stator output voltage and/or battery power to drive the field excitation circuitry.

Differentially driving the field rotor at an elevated voltage (1603), as described above (1503).

Optionally reduce the alternator/engine RPM ratio (1604), as described above (1504).

Optionally rectify the stator output using super-diodes (1605), as described above (1505).

Boost stator output to drive field coil (1606). This class of embodiments provides for a separate boost regulator connected to the stator output coil(s) to generate a separate boosted drive voltage as the power source for the field rotor excitation circuitry. This enhancement permits the field excitation to diverge from the system output bus voltage (on par with the battery voltage) produced as a result of the following element (1607). Note that in contrast to the feedback diodes generally illustrated in FIG. 3 (0321) that are used to provide field excitation current when the alternator has reached sufficiently high rotational RPM, the present invention boosts the stator output voltage in this preferred class of embodiments and uses this boosted voltage as the source for field excitation circuitry. By boosting the stator output and providing a higher field rotor coil(s) excitation voltage, the resulting stator output is increased significantly at low engine RPM.

Regulate the DC output from the super-diodes/stator coil using a buck-boost and/or buck converter (1607), as described above (1506).

Each of the above generalized system elements may incorporate a wide variety of embodiments. Additionally, some elements may be omitted in some preferred embodiments depending on system requirements and overall system construction.

Field Excitation Waveforms

The present invention utilizes dynamic field rotor excitation to achieve improved output performance and adaptability as compared to the prior art. Inherent in this approach is the potential for a wide variety of field excitation waveforms that can produce a wide variety of desirable performance benefits in the overall power generation system. Some of these field excitation waveforms will now be presented, but the present invention makes no limitation on the type of waveform suitable for use with the field rotor excitation.

Generic Pulse Width/Position/Amplitude Modulation (1700)

Figure 17:
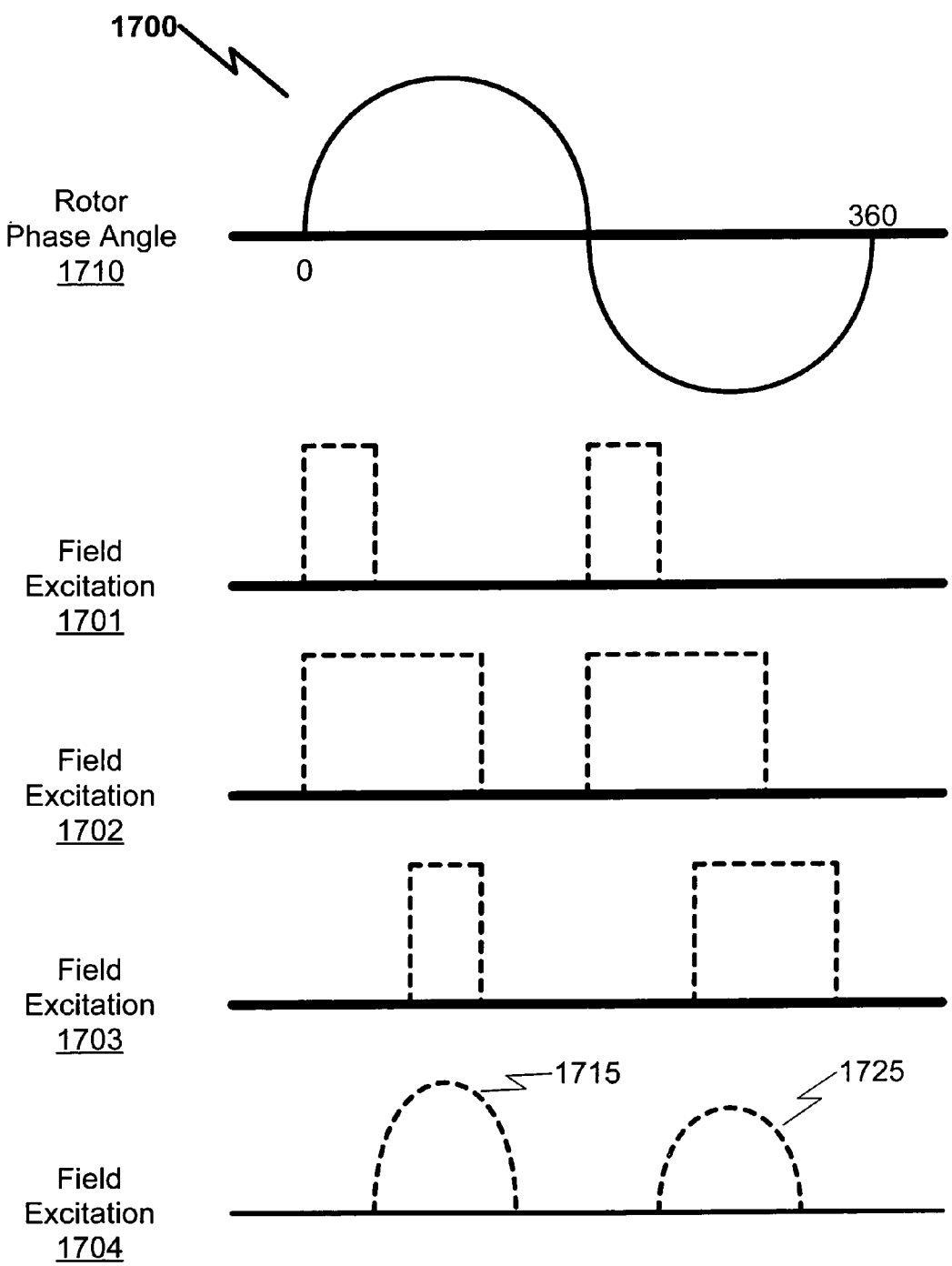
FIG. 17 illustrates several exemplary field excitation waveforms used in some preferred exemplary embodiments of the present invention.

As generally illustrated in FIG. 17 (1700), the field rotor phase (referenced to the stationary stator coil) can be represented and depicted as a sinusoid (1710) representing the phase angle. Using this phase angle as a reference, the present invention anticipates the use of pulse width modulation (PWM) (1701,1702,1703,1704) as illustrated in which the pulse width may be modulated from narrow (1701) to wide (1702) based on the desired power output of the system. The system anticipates PWM ratios from 0% (representing zero field rotor excitation width) to 100% (representing continuous field rotor excitation), in addition to variation of the amplitude of the PWM excitation from 0% (zero amplitude field excitation) to 100% (maximum available amplitude field excitation).

This scheme can be augmented by varying the phase placement/insertion of the pulse (1703) with no loss of generality. It should be noted that the pulse width/position may be varied independently as generally illustrated by (1703). Additionally, the present invention makes no restriction on the waveform used to excite the field rotor, and additional waveforms such as sinusoids, triangle waves, etc. may be utilized (1704) in some preferred embodiments. As illustrated (1704), waveform amplitude (1714,1724) may be varied as needed to meet system output power requirements. Pulse-width modulation (PWM), pulse-position modulation (PPM), amplitude modulation (AM), frequency modulation (FM), and/or phase modulation (PM) may be utilized with any of the above concepts in many preferred embodiments and are anticipated as possible variants of the present invention.

Multi-Phase Field Rotor Modulation (1800,1900)

Figure 18:
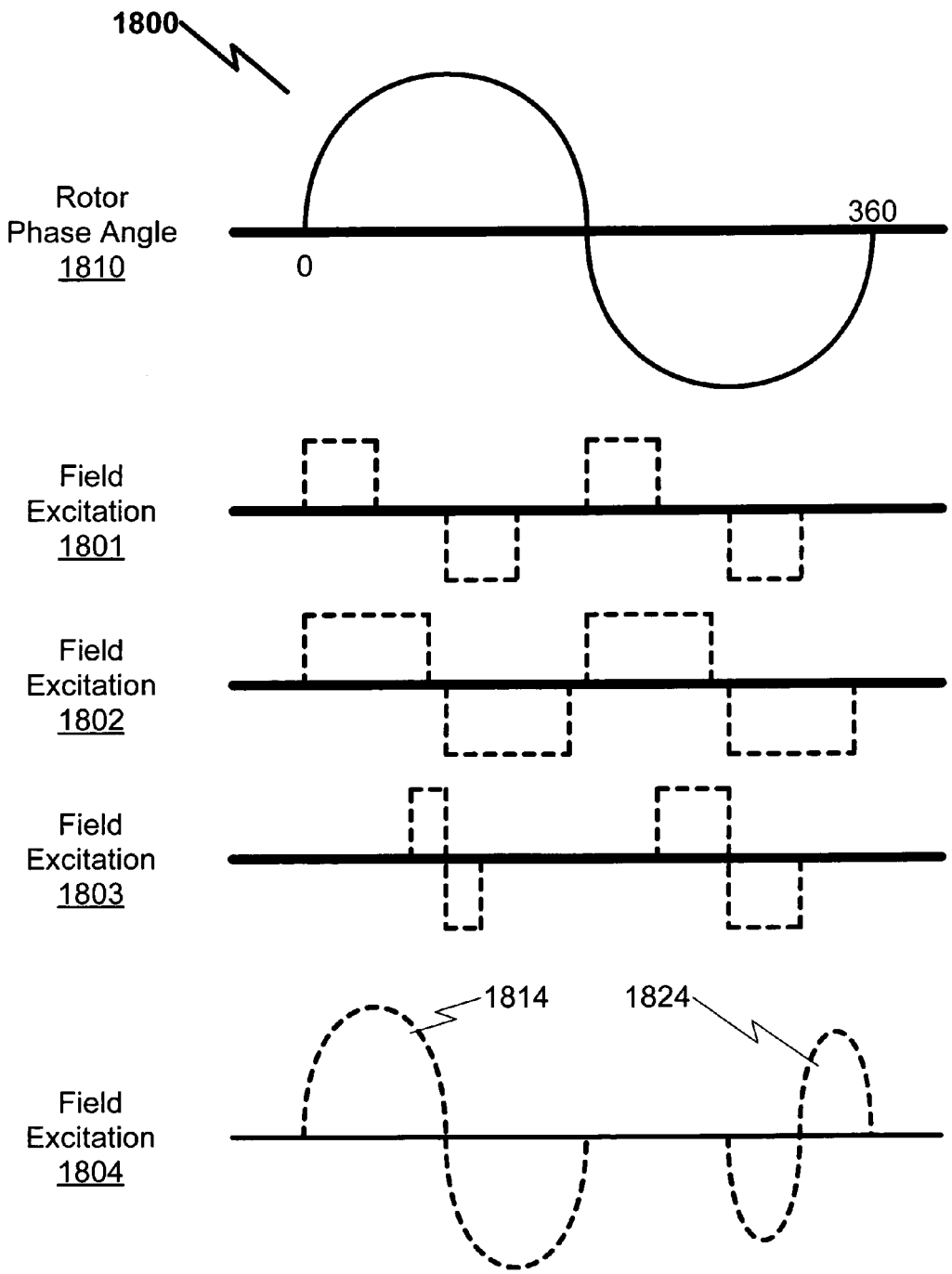
FIG. 18 illustrates several exemplary field excitation waveforms used in some preferred exemplary embodiments of the present invention.

The field rotor excitation techniques illustrated in FIG. 17 (1700) may be further augmented in some preferred exemplary embodiments of the present invention. As generally illustrated in FIG. 18 (1800), the field rotor phase (referenced to the stationary stator coil) can be represented and depicted as a sinusoid (1810) representing the phase angle. Using this phase angle as a reference, the present invention anticipates the use of multi-phase field rotor excitation (MPFE) (1801, 1802,1803,1804) as illustrated in which the pulse width may be modulated from narrow (1801) to wide (1802) based on the desired power output of the system. The system anticipates PWM ratios from 0% (representing zero field rotor excitation width) to 100% (representing continuous field rotor excitation), in addition to variation of the amplitude of the PWM excitation from 0% (zero amplitude field excitation) to 100% (maximum available amplitude field excitation).

The general concept of this approach is to utilize the differential driving capability associated with the rotor excitation to stimulate the field rotor coil(s) with both positive and negative voltage/current during a corresponding half phase (0-180 degrees) cycle of the stator. Normally a traditional prior art field rotor coil(s) is energized with a DC voltage from the alternator regulator circuitry. The use of single polarity pulsed-DC excitation as generally illustrated in FIG. 17 (1700) would correspond to a MPFE value of unity. If the phase of the field rotor coil(s) excitation is reversed as generally illustrated in FIG. 18 (1800), the MPFE value is increased by one for every field excitation reversal during the 0-360 phase transition of the field rotor/stator coil(s).

This scheme can be augmented by varying the phase placement/insertion of the pulse (1803) with no loss of generality. It should be noted that the pulse width/position may be varied independently as generally illustrated by (1803). Additionally, the present invention makes no restriction on the waveform used to excite the field rotor, and additional waveforms such as sinusoids, triangle waves, etc. may be utilized (1804) in some preferred embodiments. As illustrated (1804), waveform amplitude (1814) and position (1824) may be varied as needed to meet system output power requirements. Pulse-width modulation (PWM), pulse-position modulation (PPM), amplitude modulation (AM), frequency modulation (FM), and/or phase modulation (PM) may be utilized with any of the above concepts in many preferred embodiments and are anticipated as possible variants of the present invention.

It should be noted here that the exemplary multi-phase field excitation waveforms illustrated in FIG. 18 (1800) show only a two-phase excitation of the field rotor. The present invention anticipates that multi-phase field excitation (MPFE) values of one (1) or greater in many preferred exemplary embodiments of the present invention, and the MPFE value is not limited in value by the teachings of the present invention. One skilled in the art will recognize that the teachings of the present invention do not limit the MPFE value to integers and that appropriate intermingling of waveforms from FIG. 17 (1700) and FIG. 18 (1800) along with the teachings herein can result in non-integer MPFE values.

Figure 19:
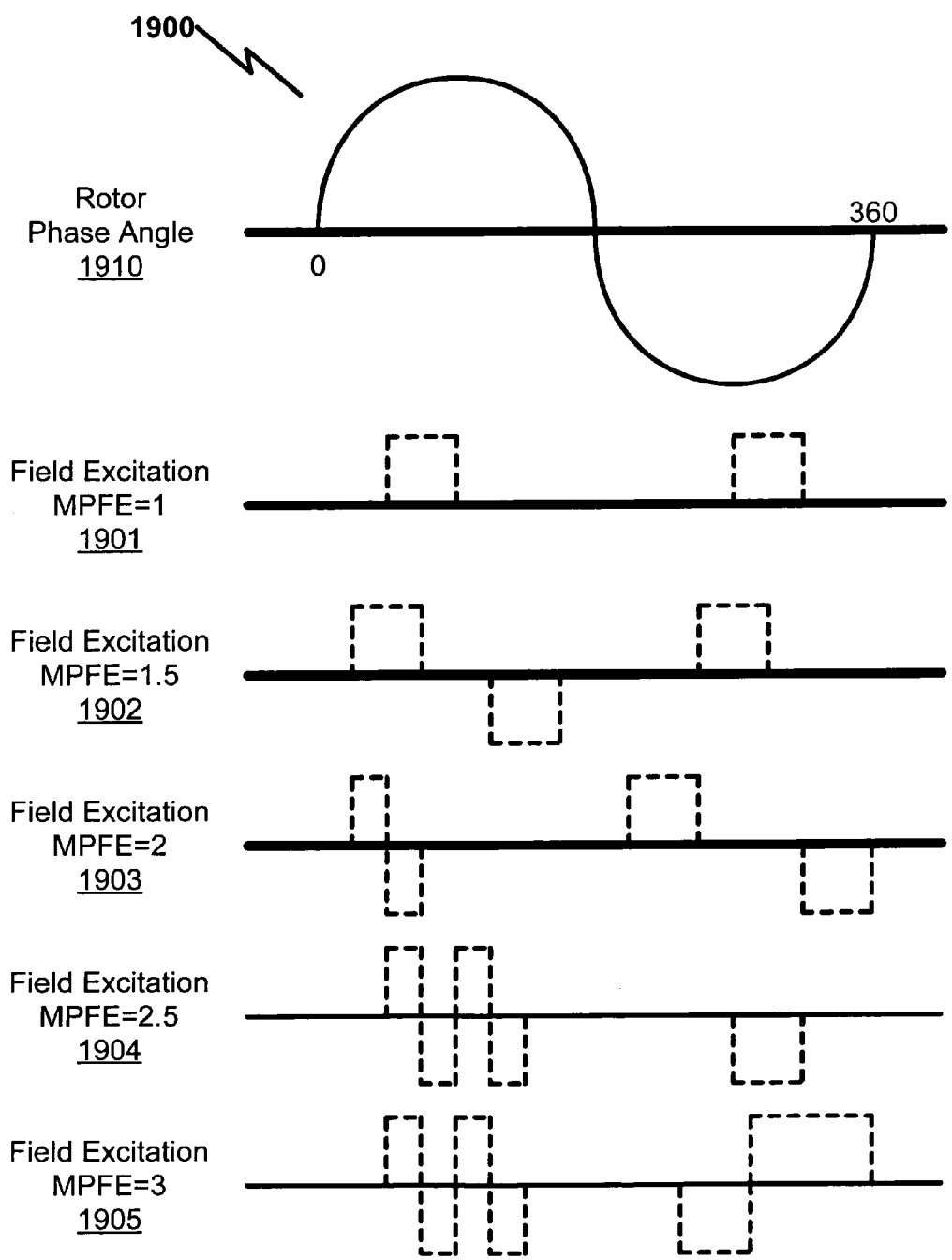
FIG. 19 illustrates several exemplary field excitation waveforms (incorporating a variety of MPFE values) used in some preferred exemplary embodiments of the present invention.

Exemplary waveforms associated with a variety of MPFE values are illustrated in FIG. 19 (1900). Pulsed field excitation is generally illustrated in waveform (1901), illustrating MPFE=1. Increasing the number of phase transitions within the 0-360 degree rotor phase reference angle (1910) results in corresponding MPFE values of 1.5 (1902), 2.0 (1903), 2.5 (1904), and 3.0 (1905). One skilled in the art will be able to recognize the MPFE pattern with these diagrams and be able to extend this teaching to higher MPFE values.

Non-integer MPFE values can be obtained by "averaging" integer and/or fractional MPFE values from the sets generally illustrated in FIG. 19 (1900). For example, a MPFE value of 1.25 can be obtained by sequential MPFE cycles of 2.5 followed by 0 (no excitation). One skilled in the art will recognize that non-integer MPFE values can be obtained in a variety of ways via the use of averaging known integer and fractional MPFE values to achieve an overall increase in alternator output performance.

The modulation of the MPFE value by the present invention is a method whereby the perceived rotational velocity of the alternator may be increased arbitrarily to compensate for insufficient output at low alternator shaft RPM values. Thus, the present invention anticipates modulation of the MPFE value in response to the engine RPM value in an attempt to stabilize the output of the alternator over a wide range of engine RPM values.

Dynamic RPM Selection Utilizing Multi-Phase Field Excitation

It is significant to note the benefit of multi-phase field rotor excitation at low alternator RPM. Since traditional alternators are only 30-40% efficient at low rotational (idle) RPM, and since many trucks/automobiles spend 30-40% of their time at idle speed, most trucks/automobiles ratio the alternator speed to be some multiple of the engine speed (2× to 3× generally) to ensure that the alternator achieves sufficient RPM to generate power even at idle engine RPM. This results in a host of problems at elevated engine RPM as the alternator experiences significant wear, heat, and other mechanical issues due to the elevated speed (caused by the speed multiplication pulley) at high engine RPM.

The present invention solves this problem via use of MPFE values that are greater than unity at low engine RPM. The use of a MPFE value greater than unity means that while the field rotor spins at the same rotational velocity with respect to the stationary stator coils, the EFFECTIVE magnetic rotational velocity is multiplied by the MPFE value. For example an alternator field rotor excited using a unity MPFE value and waveforms illustrated in FIG. 17 (1700) would appear to have a magnetic rotational speed equal to the alternator shaft RPM. If the MPFE value were increased to two (2), the EFFEC- TIVE magnetic rotational speed would have DOUBLED, even though the alternator shaft speed remained constant. This is because the use of MPFE values greater than unity excited the stator coils a multiple number of times per field rotor revolution, just as if the field rotor shaft had increased its rotational velocity corresponding to the increase in MPFE value.

This technique can be utilized in conjunction with amplitude modulation of the field rotor (via the bridge driver (0702) in FIG. 7 (0700)) to overcome the poor output characteristics of traditional alternators at low engine RPM. This also permits alternators to run at the same RPM as the engines that drive them (using 1:1 driving pulleys instead of 2:1 or greater drive pulleys). This results in lower rotational losses associated with the alternator at elevated engine RPM because the alternators are optimally running at a lower speed with the present invention than that of the prior art. Mechanical stresses, thermal losses, bearing longevity, and reliability are necessarily improved by the use of lower alternator RPM in these scenarios.

Additionally, as mentioned previously, the alternator fan power losses are proportional to the CUBE of the alternator RPM value. In an exemplary invention embodiment configuration where MPFE excitation is utilized with unity engine RPM excitation, the present invention can reduce alternator fan losses by 94% as compared to a prior art alternator driven by a 2.5:1 engine/alternator pulley ratio.

Phase Based Amplitude/PWM Modulation (2000)

Figure 20:
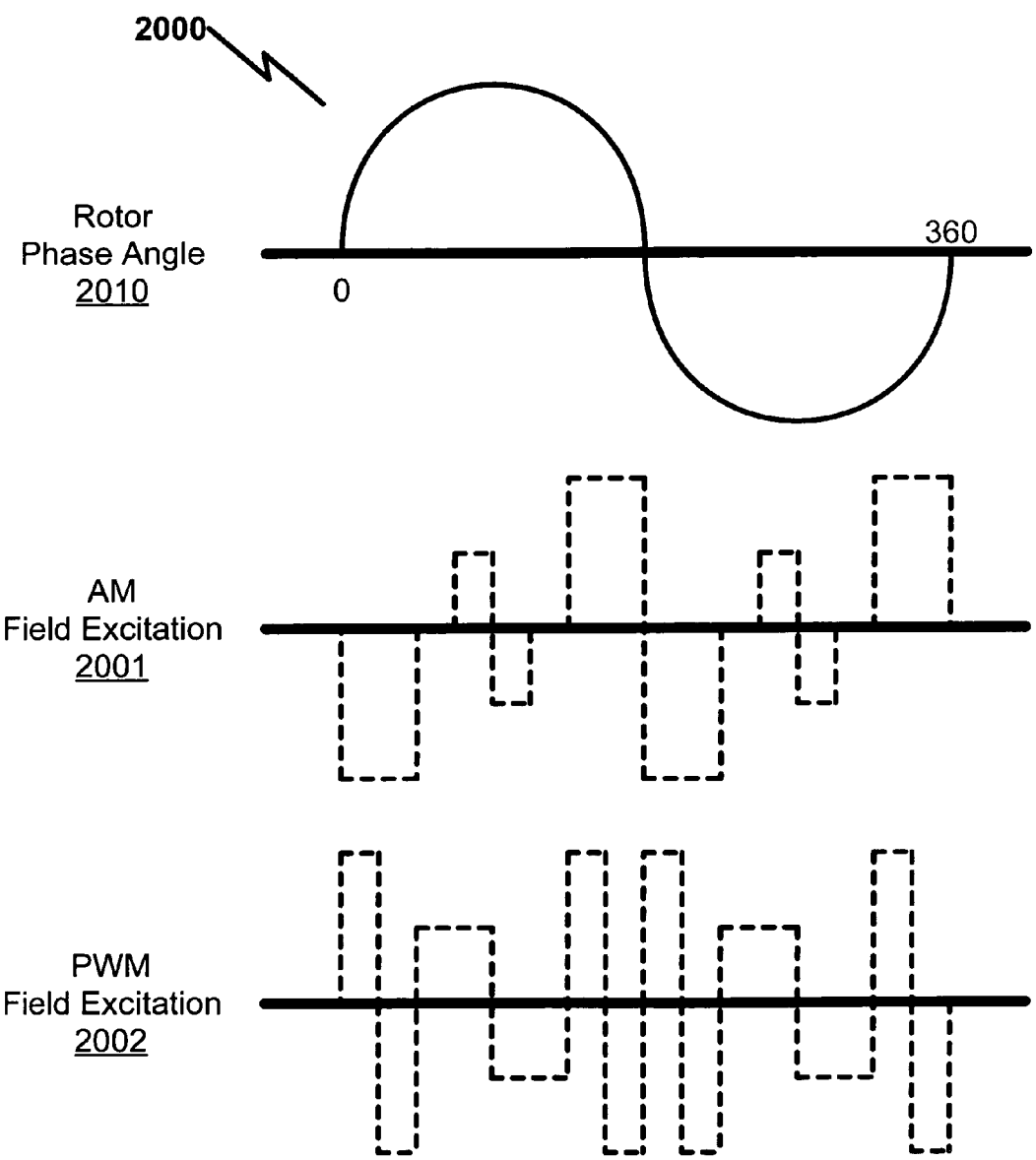
FIG. 20 illustrates several exemplary field excitation waveforms (incorporating a variety of amplitude modulation methodologies) used in some preferred exemplary embodiments of the present invention.

As discussed previously, the present invention anticipates a wide variety of field rotor coil(s) excitation waveforms within various embodiments of the invention. Some preferred exemplary embodiments may utilize amplitude modulation (AM) for some field rotor coil(s) excitation as generally illustrated in FIG. 20 (2000). With respect to the rotor phase angle (2010), an example of AM modulation is presented in diagram (2001).

As illustrated in FIG. 20 (2000), amplitude modulation (2001) may be utilized within the field rotor coil(s) to enhance the output generation of the alternator by "front-loading" and "back loading" the excitation voltage with elevated voltage/current values that will translate into a stator output waveform that is not sinusoidal, but rather a waveform incorporating steeper slopes associated with the leading and trailing edge of the field rotor excitation waveform.

As illustrated, the AM modulation (2001) can be integrated with additional phase transitions within the body of the stator phase envelope to affect non-unity MPFE values as previously detailed.

The advantage of this approach over that of the prior art is evidenced by the fact that the enhanced amplitude excitation of the field rotor coil(s) at a time when the corresponding stator coil(s) output is normally minimized (if the field coil(s) were statically excited with a lower voltage/current) results in a larger stator coil(s) output due to the increased field rotor coil(s) excitation. This results in additional power being generated by the alternator as the over-excited field rotor coil(s) (and their associated magnetic field(s)) are mechanically swept through the fixed stator coil(s).

As generally illustrated in FIG. 20 (2000), pulse-width modulation (PWM) (2002) may also incorporate amplitude modulation (AM) in some preferred exemplary embodiments to affect improved alternator output performance by increasing effective rotational velocity during stator phase periods where stator coil(s) output is normally minimized.

Phase Synchronization Based on Stator Coil Excitation

The phase detector generally illustrated in FIG. 5 (0503) and FIG. 7 (0703) in various preferred embodiments of the present invention need not necessarily comprise a physical detector to determine the rotational phase relationship between the field rotor coil(s) and the stator coil(s). In some preferred embodiments of the present invention the phase detector simply correlates the output of the stator coil(s) with respect to the field rotor coil(s) excitation and generates a phase indicator based on this measured relationship. This technique may incorporate static or dynamic phase sampling based on the field rotor coil(s) excitation and/or stator coil(s) output as described below.

Static Phase Sampling (2100)

Figure 21:
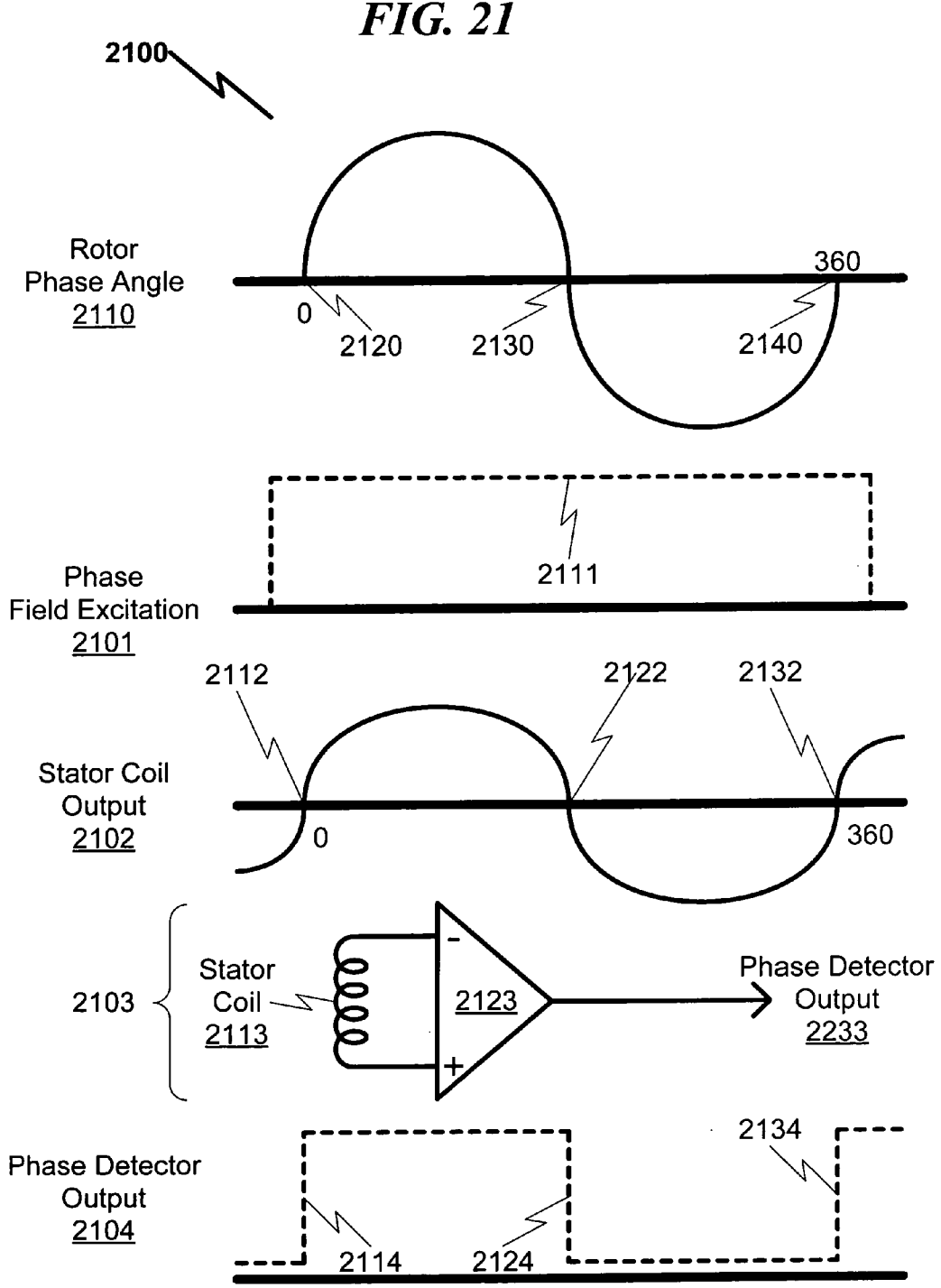
FIG. 21 illustrates the use of static phase sampling used in some preferred exemplary embodiments of the present invention.

As generally illustrated in FIG. 21 (2100), this phase measurement may take the form of a static approach in which the field rotor coil(s) is excited with a known static voltage/current and the zero voltage transitions (or transitions crossing a known voltage threshold) of the stator coil(s) output are determined. Once these zero voltage transitions are known in time over a given cycle, the rotational speed and overall phase relationship between the field rotor coil(s) and the stator coil(s) can be determined. The static approach can be initiated at various times to ensure that a proper phase measurement between the field rotor coil(s) and stator coil(s) is accurately maintained.

An example of these techniques is generally illustrated in FIG. 21 (2100), wherein the relative phase relationship between the field rotor coil(s) and stator coil(s) is schematically illustrated by the waveform (2110). In the case of a static phase detection approach, the field rotor coil(s) is excited by a test waveform (2101) having a known amplitude (2111). The constant amplitude of this waveform (2111) results in a corresponding stator coil output waveform (2102) with phase transitions at 0 (2112), 180 (2122), and 360 (2132) degrees. These phase transitions can be detected in a variety of ways, with a general phase detection schematic illustrated (2103) using the stator coil (2113) output as control input to a comparator (2123) that generates a phase detector output (2133). The resulting phase detector output (2104) waveform contains edge transitions (2114, 2124, 2134) that correspond directly to the phase transitions (2112, 2122, 2132) in the stator coil output and the corresponding field rotor/stator coil phase transitions (2120, 2130, 2140).

Dynamic Phase Sampling (2200)

This phase measurement may also take the form of a dynamic approach in which the field rotor coil(s) is excited with a known dynamic voltage/current and the zero voltage transitions (or reference voltage transitions) of the stator coil (s) output are determined given this known excitation. Once the zero voltage transitions are known in relation to the known field rotor coil(s) excitation, the rotational speed and overall phase relationship between the field rotor coil(s) and the stator coil(s) can be determined. The dynamic approach can be initiated at various times to ensure that a proper phase measurement between the field rotor coil(s) and stator coil(s) is accurately maintained.

Figure 22:
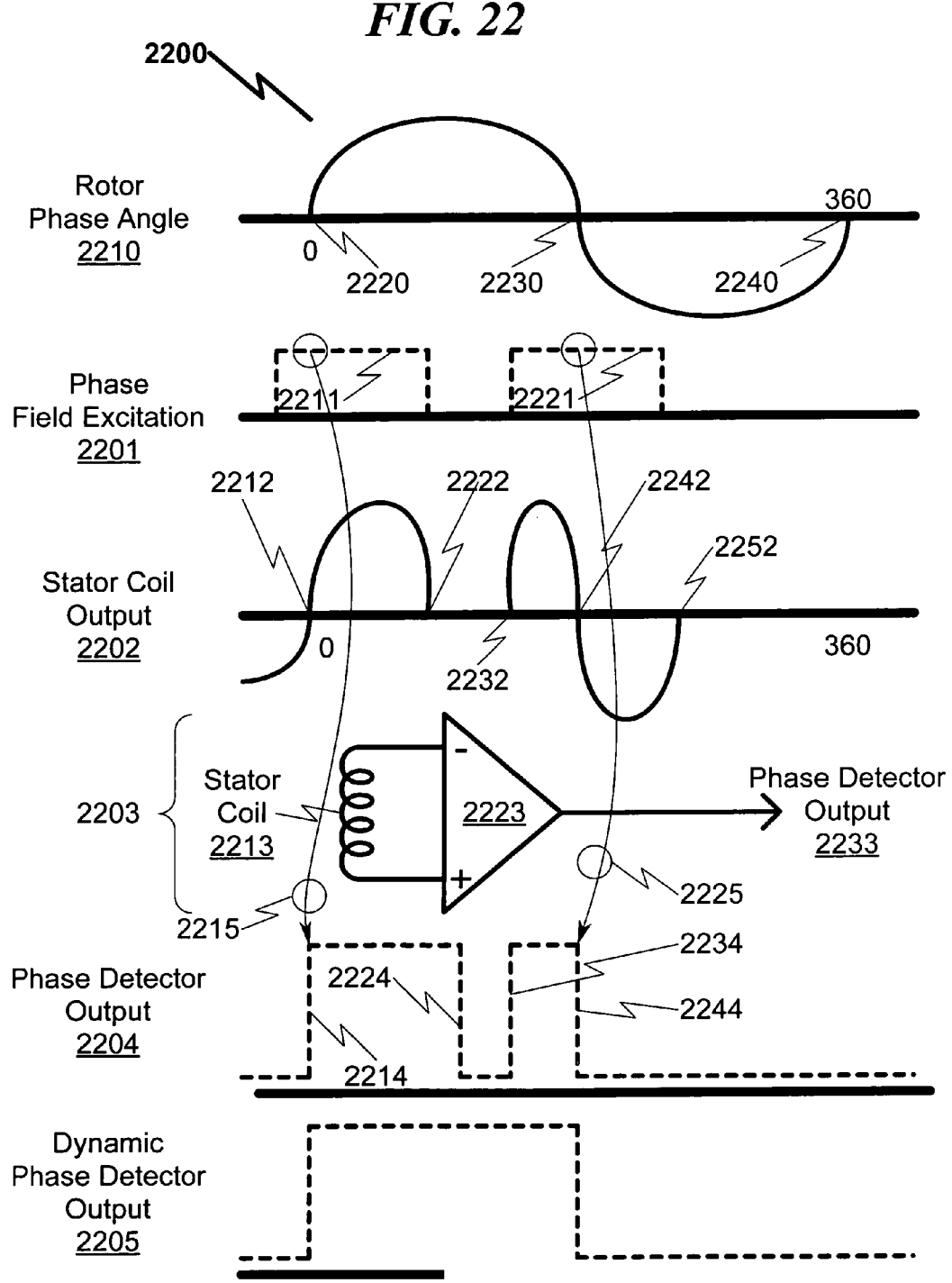
FIG. 22 illustrates the use of dynamic phase sampling used in some preferred exemplary embodiments of the present invention.

An example of these techniques is generally illustrated in FIG. 22 (2200), wherein the relative phase relationship between the field rotor coil(s) and stator coil(s) is schematically illustrated by the waveform (2210). In the case of a dynamic phase detection approach, the field rotor coil(s) is excited by a known excitation waveform (2201). The varied (but known) amplitude of this waveform (2211, 2221) results in a corresponding stator coil output waveform (2202) with various phase transitions at (2112, 2222, 2232, 2242, 2252). These phase transitions can be detected in a variety of ways, with a general phase detection schematic illustrated (2203) using the stator coil (2213) output as control input to a comparator (2223) that generates a phase detector output (2233). The resulting phase detector output (2204) waveform contains edge transitions (2214, 2224, 2234, 2244) that correspond directly to the phase transitions (2112, 2222, 2232, 2242, 2252) in the stator coil output. Note, however, in the case of the dynamic phase detection methodology, ONLY the detected phase transitions corresponding to periods (2215, 2225) in which the phase field excitation is stable and active (2211, 2221) are valid. Thus, the phase detector output (2204) when interpreted with this constraint will yield the dynamic phase detector output (2205) waveform as illustrated. This dynamic phase detector output has edge transitions corresponding to the proper phase transitions (2220, 2230) in the field rotor/stator coil(s) phase relationship.

Engine Speed Phase Resynchronization

Note that in either of the above situations engine RPM information from other sources (engine control computer, etc.) can be used to determine if the phase relationship has changed and thus initiate a new phase measurement using one or more of the above techniques.

Dynamic Adaptive Phase Tracking (2300)

The phase detector utilized in various preferred embodiments of the present invention may incorporate a dynamic adaptive phase tracking element to permit precise time-based field rotor coil(s) excitation linked to a precise phase relationship between the field rotor coil(s) and the stator coil(s). This dynamic adaptive phase tracking element permits the present invention to excite the field coil(s) with arbitrary waveforms in precise phase relationship to the stator coil(s).

As generally illustrated in FIG. 17 (1700), FIG. 18 (1800), FIG. 19 (1900), and FIG. 20 (2000), the present invention anticipates a wide variety of field coil(s) excitation waveforms to be incorporated in a wide variety of system/method embodiments of the present invention. Within FIG. 17 (1700)-FIG. 20 (2000) the phase relationship between the field rotor coil(s) and stator coil(s) has been schematically illustrated (1710, 1810, 1910, 2010) in depiction of the exemplary field excitation waveforms that have been depicted. This rotor phase angle (1710, 1810, 1910, 2010) may be implemented via the use of the sensor-based, static, and/or dynamic phase detection methodologies mentioned previously and generally depicted in FIG. 21 (2100) and FIG. 22 (2200) to detect the beginning (or middle) of a phase cycle. That is, the previously discussed techniques are useful for detecting the 0, 180, and 360 degree phase transitions (and multiples of these phase values).

Figure 23:
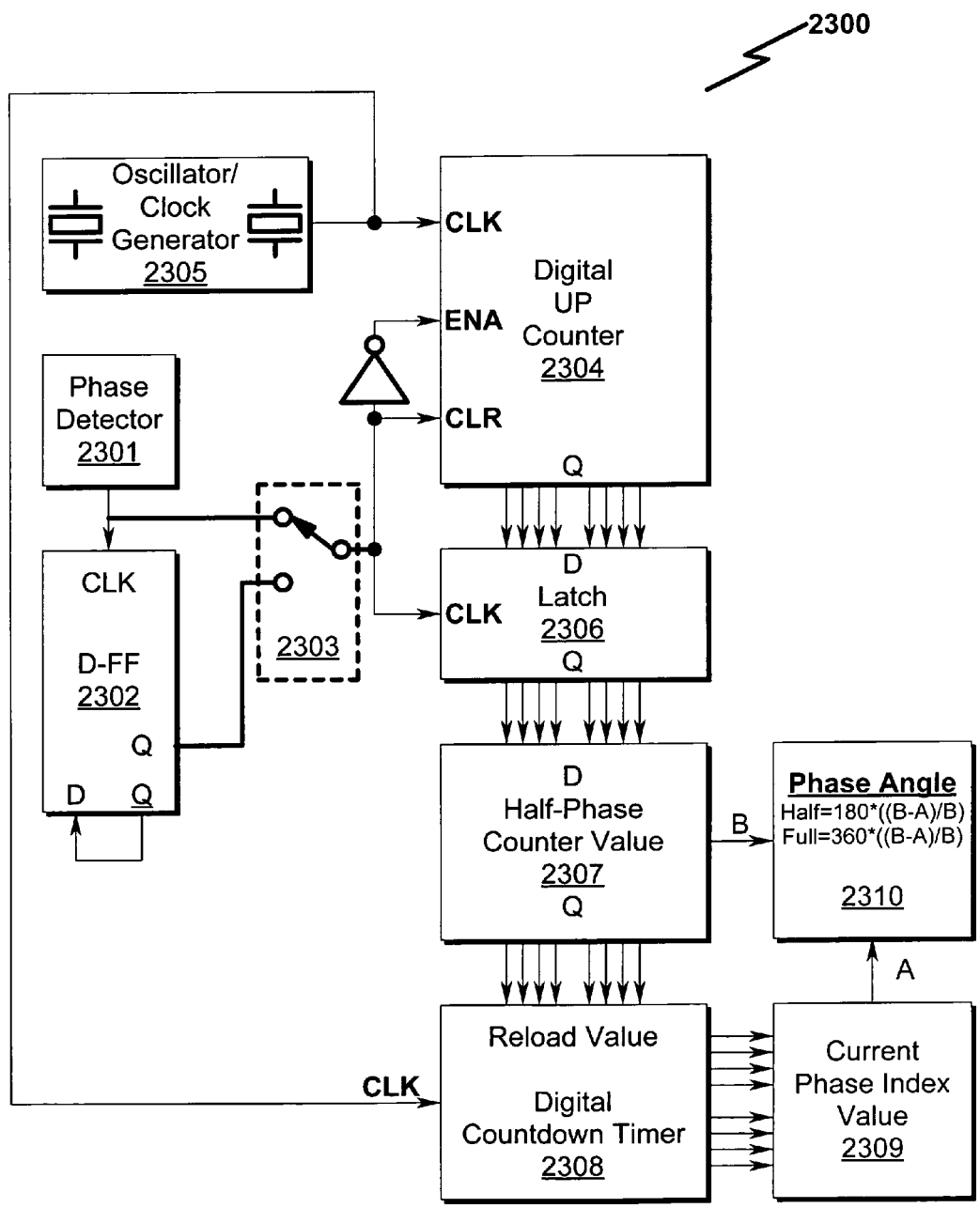
FIG. 23 illustrates the use of dynamic adaptive phase tracking used in some preferred exemplary embodiments of the present invention.

Finer granularity to permit more precise placement of field excitation waveforms within this phase detection framework is possible using many techniques, one exemplary technique whose exemplary embodiment is generally illustrated in FIG. 23 (2300). Fine granularity placement of field excitation waveforms can be used to shift the edge timing of field excitation waveforms to compensate for MOSFET gate capacitance delays, inductance delays, switching delays, etc., that can negatively impact stator coil output characteristics. Within this context, a general phase transition detector (2301) (as previously described in the sensor-based, static, and/or dynamic phase detection methodologies mentioned previously and generally depicted in FIG. 21 (2100) and FIG. 22 (2200)) is used to signal the start of a given phase cycle to a digital counter (2303) that is clocked by an oscillator/clock generator (2304). During half the phase detector cycle, the phase detector (2301) (as generally depicted by waveform (2104) in FIG. 21) will enable the digital counter (2304) to count clock generator (2305) cycles. When the end of the ENABLE phase cycle is reached, the current counter (2304) value is saved to a latch (2306) and retained as a half-phase counter value (2307). This half-phase counter value (2307) is used as a reload value for a digital countdown timer (2308) that is clocked by the previously described oscillator/clock generator (2305). The output of the digital countdown timer (2308) is maintained as a current phase index value (2309), and may be used to calculate an absolute phase angle (2310) if necessary by multiplying the current phase index value (2309) by 180 and dividing this product by the half-phase counter value (2305).

One of ordinary skill in the art will recognize the incorporation of an optional D-style flip-flop (2302) configured as a divide-by-two counter in conjunction with a configuration switch (2303) that permits the system depicted in FIG. 23 (2300) to calculate the full-phase angle by modifying the half-phase phase detector (2301) such that then ENABLE signal high level is stretched to encompass the entire 360 degrees of field rotor/stator phase. Thus, the exemplary circuit of FIG. 23 (2300) may be used to calculate either the half-phase index, or with switch (2303) in the down position configured to calculate the full-phase index. Note in the down position the corresponding "full" for "half" phase designations are appropriate in blocks (2307), (2309), and (2310), with the full phase angle being calculated as 360*((B−A)/B) in block (2310).

One skilled in the art will recognize that the dynamic phase tracking methodology taught in FIG. 23 (2300) may be incorporated on a suitably equipped microcontroller/microprocessor having integrated timers, counters, and counter/timer inputs under the control of appropriate software. The present invention anticipates that the best mode embodiments of the present invention will have this implementation form and be consistent with construction techniques taught in U.S. Pat. No. 6,396,137 described previously herein.

Additionally, it should be noted that while digital dynamic adaptive phase tracking techniques are utilized in many preferred embodiments, the present invention does not preclude the use of analog techniques to provide dynamic adaptive phase tracking information. These may include but are not limited to one-shot multivibrators, cascaded one-shot triggers, and the like to properly position excitation waveforms within the field coil(s) in relation to a particular phase relationship with the stator coil(s).

Elimination of Stator Rectification (2400)

As stated previously, the present invention anticipates a wide variety of field rotor coil(s) excitation waveforms in the various embodiments of the present invention. One particular class of excitation waveforms permits the stator coil(s) output to be DC rather than AC in nature, thus permitting elimination of signal rectification at the output of the stator coil(s). There are several reasons that this technique is advantageous, the major one being the fact that elimination of the need for stator coil(s) output rectification significantly reduces power losses in the portion of the power generation system in which energy flow is maximized. By eliminating the power rectification from the stator portion of the system and modifying the field excitation circuitry to compensate for this modification, the power switching in the overall power generation system can be moved back to a point in the system where power dissipation is minimized (that is, within the field rotor coil(s)).

For example, in an alternator with 200 amp stator output, the field excitation current is on the order of 6-7 amperes DC. Use of rectification in the stator output of this alternator requires that the rectification elements support 200A of current flow and the corresponding power dissipation associated with the rectification voltage drop. The present invention in some preferred embodiments eliminates the need for stator rectification and moves the current switching elements (that generate an alternating field in the field rotor coil(s)) to the field rotor coil(s) that require an order of magnitude less pass current (~10A) support than the stator output circuitry rectification would require (~200A).

Figure 24:
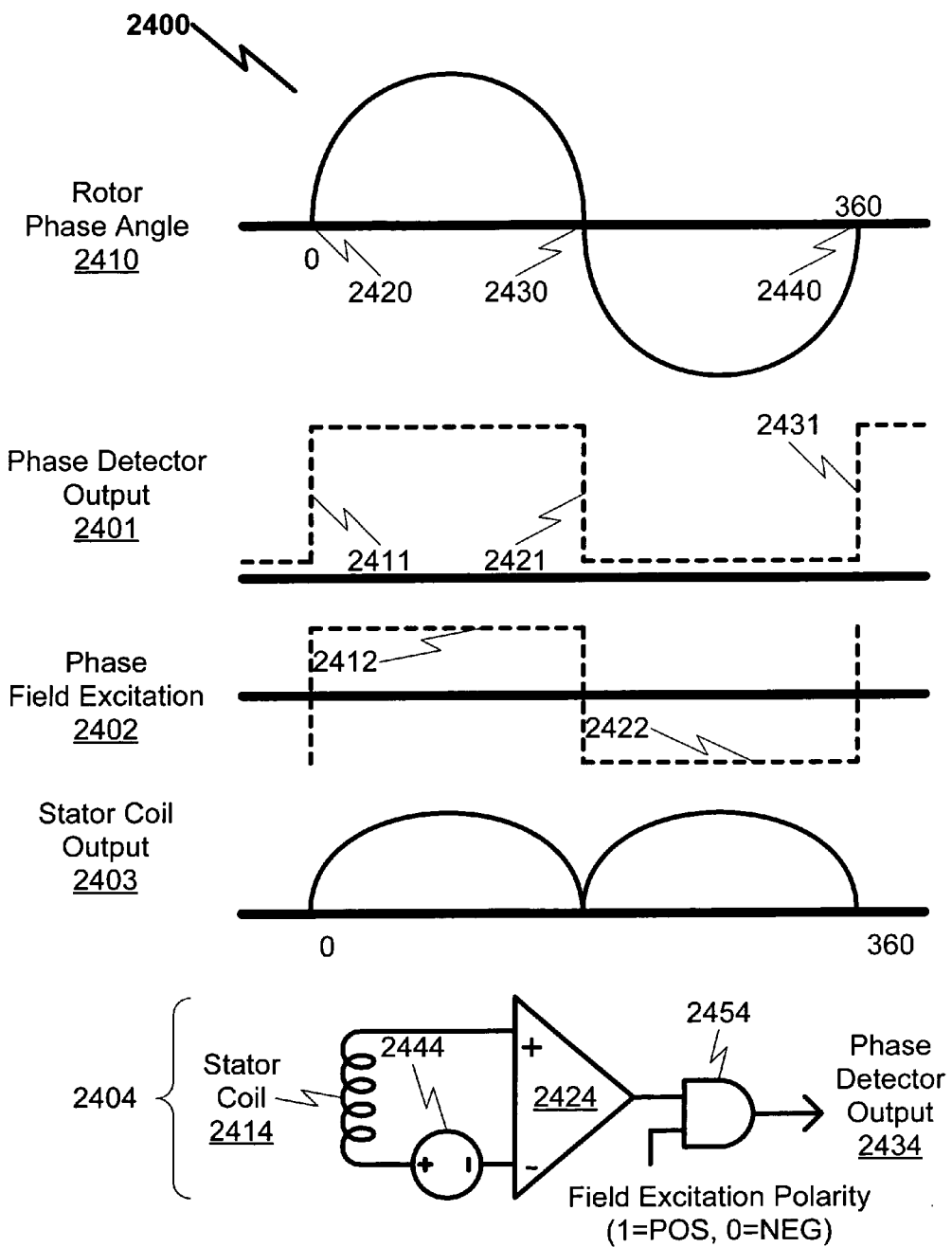
FIG. 24 illustrates the use of multi-polarity field coil(s) excitation used in some preferred exemplary embodiments of the present invention.

FIG. 24 (2400) generally illustrates how this technique is applied to some preferred exemplary embodiments of the present invention. As previously discussed, the phase relationship between the field rotor coil(s) and the stator coil(s) is generally depicted by the top waveform (2410) with corresponding phase transition points at 0 (2420), 180 (2430), and 360 (2440) degrees as depicted. As previously discussed, the phase detector may be used to map the stator coil phase transitions and produce a phase detection waveform (2401) that maps the phase transitions (2411, 2421, 2431) in the field rotor/stator phase relationship. This phase detection information (2401) is then used to differentially drive a bridge driver circuit (see generally FIG. 7 (0702), FIG. 9 (0910)) to produce a field rotor excitation waveform (2402) as generally illustrated. Note that this waveform (2402) is bipolar, reversing the polarity of the magnetic field at the phase transition points (2411, 2421, 2431) of the phase detector (2401). This bipolar field rotor excitation (2402) results in a DC-only pulsed output from the stator coil (s) (2403). This output can be capacitively filtered and/or fed into a buck-boost converter for application to the bus output of the power generation system.

Note that the generalized exemplary phase detector (2404) that senses the stator coil (2414) output may utilize a comparator (2424) to produce the phase detector output (2434) as previously described, with the addition of a voltage offset (2444) to compensate for the pulsed DC nature of the stator coil(s) waveform. Thus, the phase detector may operate from polarity changes in the stator coil(s) output as well as based on the stator coil(s) voltage exceeding/crossing (in either a positive or negative sense) a predetermined positive or negative voltage threshold value. The use of a logic gate (2454) in conjunction with the polarity of the field excitation waveform (0=negative excitation, 1=positive excitation) can also be utilize here to clip the phase detector output (2434) and make it compatible with previous discussions herein. One skilled in the art will recognize that this technique can be used to determine the zero (or near zero) phase transition point of the pulsed DC output of the stator coil(s) in this implementation.

The advantage of this approach over the prior art is that the power dissipated within the field rotor coil(s) is significantly less than the energy flowing through the stator coil(s). Thus, the energy lost due to rectification in the stator coils is eliminated and substituted with lower energy loss within the field rotor coil(s) and associated magnetics.

Exemplary Buck Regulator Topology (2500)

Figure 25:
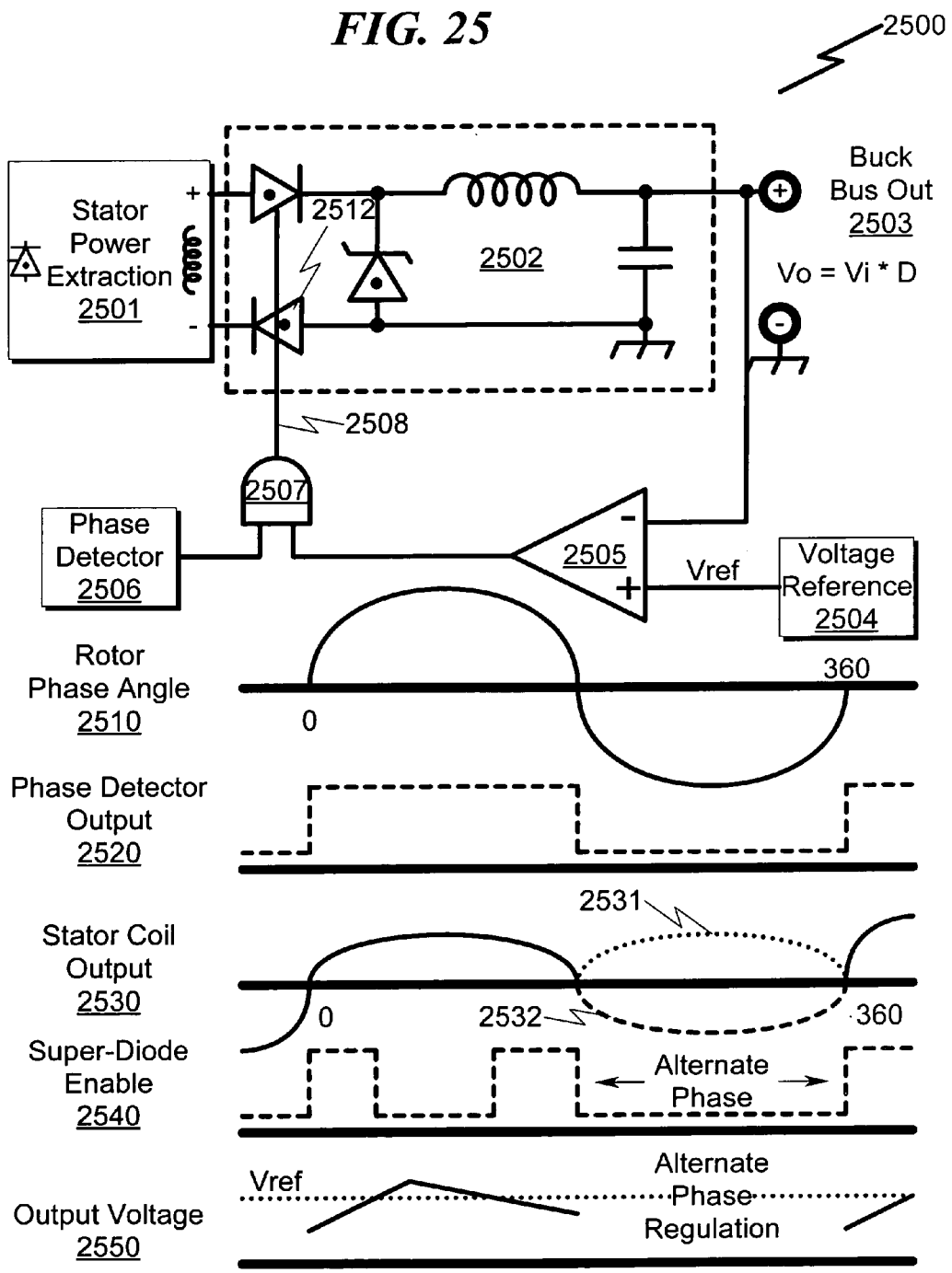
FIG. 25 illustrates an exemplary buck converter topology used in some preferred exemplary embodiments of the present invention.

The present invention anticipates a wide variety of buck and/or buck-boost regulator configurations to regulate the stator coil(s) output voltage. One such topology useful in some preferred exemplary embodiments of the present invention is generally illustrated in FIG. 25 (2500). In this configuration, the stator coil(s) power extraction element (2501) may represent the output of a super-diode rectifier or in some embodiments direct connection to the stator coil(s) themselves (depending on the field rotor coil(s) excitation discussed previously herein). The output of the stator power extraction element (2501) is fed into a buck converter (2502) incorporating super-diodes to produce a buck bus output (2503). Regulation of the buck bus output (2503) is accomplished by using a voltage reference (2504) to compare (2505) the output bus voltage (2503) in coordination with the phase detector (2506). The gated (2507) enable (2508) is then used as the super-diode enable within the buck converter. The duty cycle (D=0 . . . 1) of this enable signal (2508) determines the overall converter (2503) output voltage by the relation $Vo=D*Vi$.

FIG. 25 (2500) illustrates typical waveforms for the rotor phase angle (2510), phase detector output (2520), stator coil output (2530), super-diode enable (2540), and bus output voltage (2550). Note that the circuitry illustrated in FIG. 25 (2500) is designed to operate correctly when the stator power extraction (2501) is a positive voltage. The buck circuitry (2502) can be replicated and mirrored to support regulation of the output bus voltage during the low portion of the phase detector output (corresponding to rotor phase angle 180-360 degrees) by simply inverting the sense of the phase detector (2506) that provides gating (2507) for the super-diode enable (2508). One skilled in the art will recognize that the second switching super-diode (2512) may be dispensed with in situations where the stator power extraction (2501) produces a pulsed DC stator output (2531). The additional super-diode (2512) may be incorporated to support integration of two buck-boost converters in situations where the stator coil(s) output is AC rather than pulsed DC.

Exemplary Buck-Boost Regulator Topology (2600)

Figure 26:
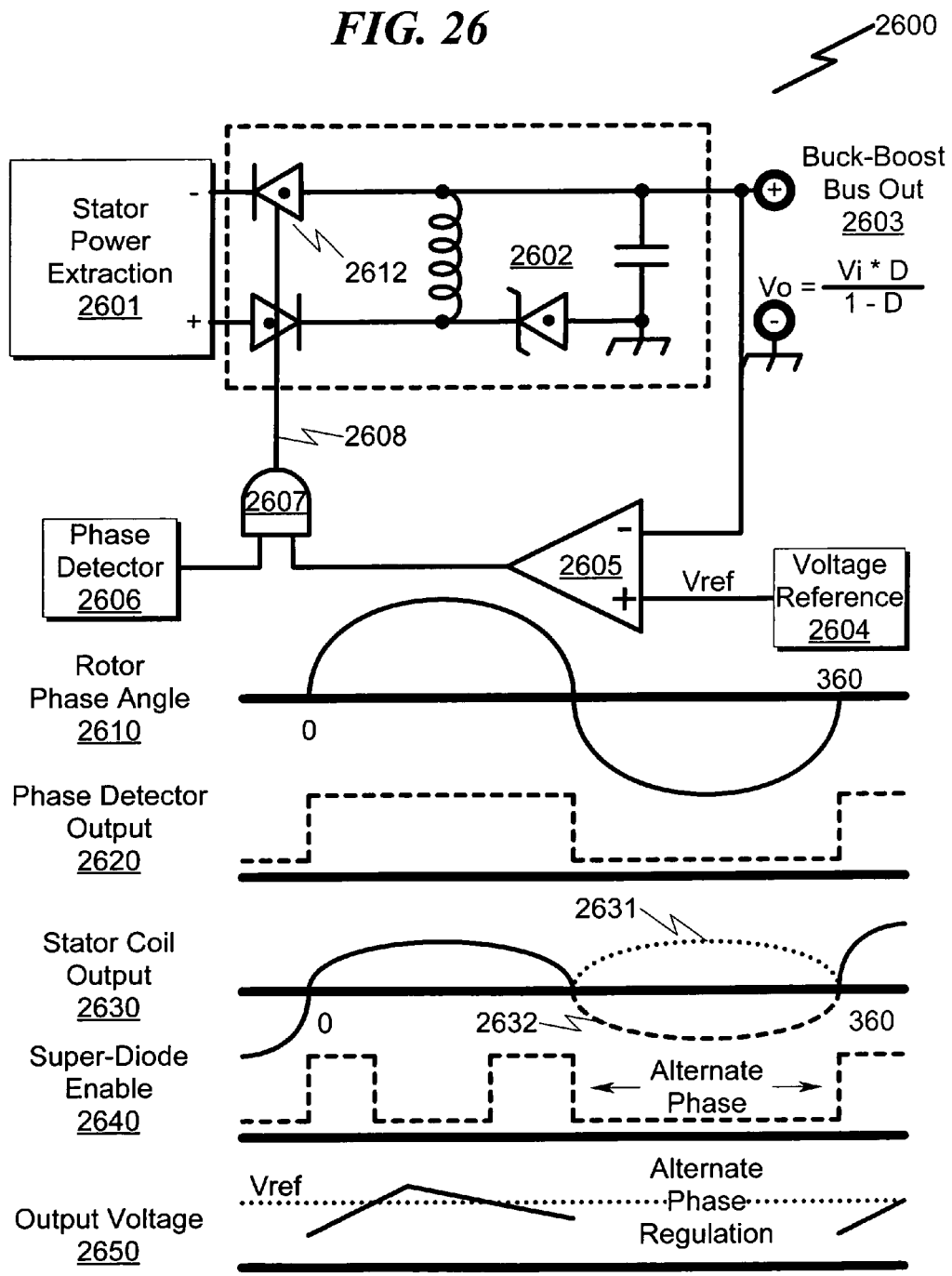
FIG. 26 illustrates an exemplary buck-boost converter topology used in some preferred exemplary embodiments of the present invention.

The present invention anticipates a wide variety of buck and/or buck-boost regulator configurations to regulate the stator coil(s) output voltage. One such topology useful in some preferred exemplary embodiments of the present invention is generally illustrated in FIG. 26 (2600). In this configuration, the stator coil(s) power extraction element (2601) may represent the output of a super-diode rectifier or in some embodiments direct connection to the stator coil(s) themselves (depending on the field rotor coil(s) excitation discussed previously herein). The output of the stator power extraction element (2601) is fed into a buck-boost converter (2602) incorporating super-diodes to produce a buck-boost bus output (2603). Regulation of the buck-boost bus output (2603) is accomplished by using a voltage reference (2604) to compare (2605) the output bus voltage (2603) in coordination with the phase detector (2606). The gated (2607) enable (2608) is then used as the super-diode enable within the buck converter. The duty cycle (D=0 . . . 1) of this enable signal (2608) determines the overall converter (2603) output voltage by the relation $Vo=(Vi*D)/(1-D)$. The circuit description for the above buck converter (FIG. 25 (2500)) also applies for this buck-boost topology, with the exception that the output voltage of this converter may exceed that of the stator power extractor (2601).

As with previous designs, an additional super-diode (2612) may be incorporated to support integration of two buck-boost converters in situations where the stator coil(s) output is AC rather than pulsed DC. As stated previously, the use of a buck-boost topology to interface the stator power extraction (whether through super-diode rectification or direct stator coil(s) interface) permits low output stator coil(s) output to be boosted in voltage to supply the output power bus (2603) in situations where a prior art alternator would not generate sufficient voltage to supply any current to the bus (2603).

Exemplary Cuk Regulator Topology (2700)

Figure 27:
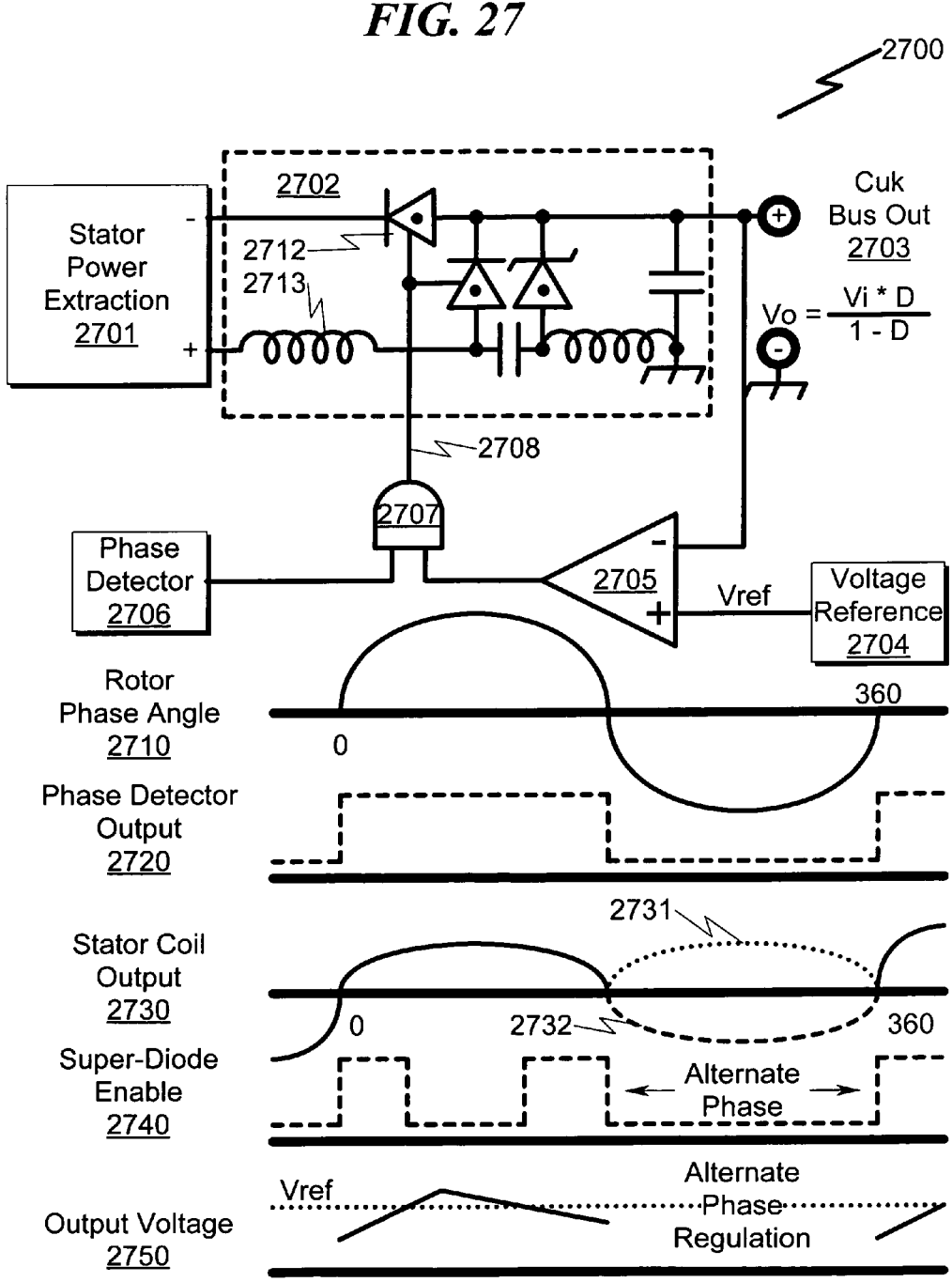
FIG. 27 illustrates an exemplary Cuk buck-boost converter topology used in some preferred exemplary embodiments of the present invention.

The present invention anticipates a wide variety of buck and/or buck-boost regulator configurations to regulate the stator coil(s) output voltage. One such topology useful in some preferred exemplary embodiments of the present invention is generally illustrated in FIG. 27 (2700). In this configuration, a Cuk converter is utilized to provide buck-boost capability similar to that described in FIG. 26 (2600). While the converter topology is different in this example, the same control circuitry can be utilized to affect output regulation of the output bus (2703). Note, however, the leading inductor utilized in the Cuk converter (2713) may be incorporated within the stator coil(s) windings within the alternator frame, thus saving significant volume in construction. As with previous designs, an additional super-diode (2712) may be incorporated to support integration of two buck-boost converters in situations where the stator coil(s) output is AC rather than pulsed DC.

Exemplary SEPIC/Split-Pi Regulator Topology (2800)

Figure 28:
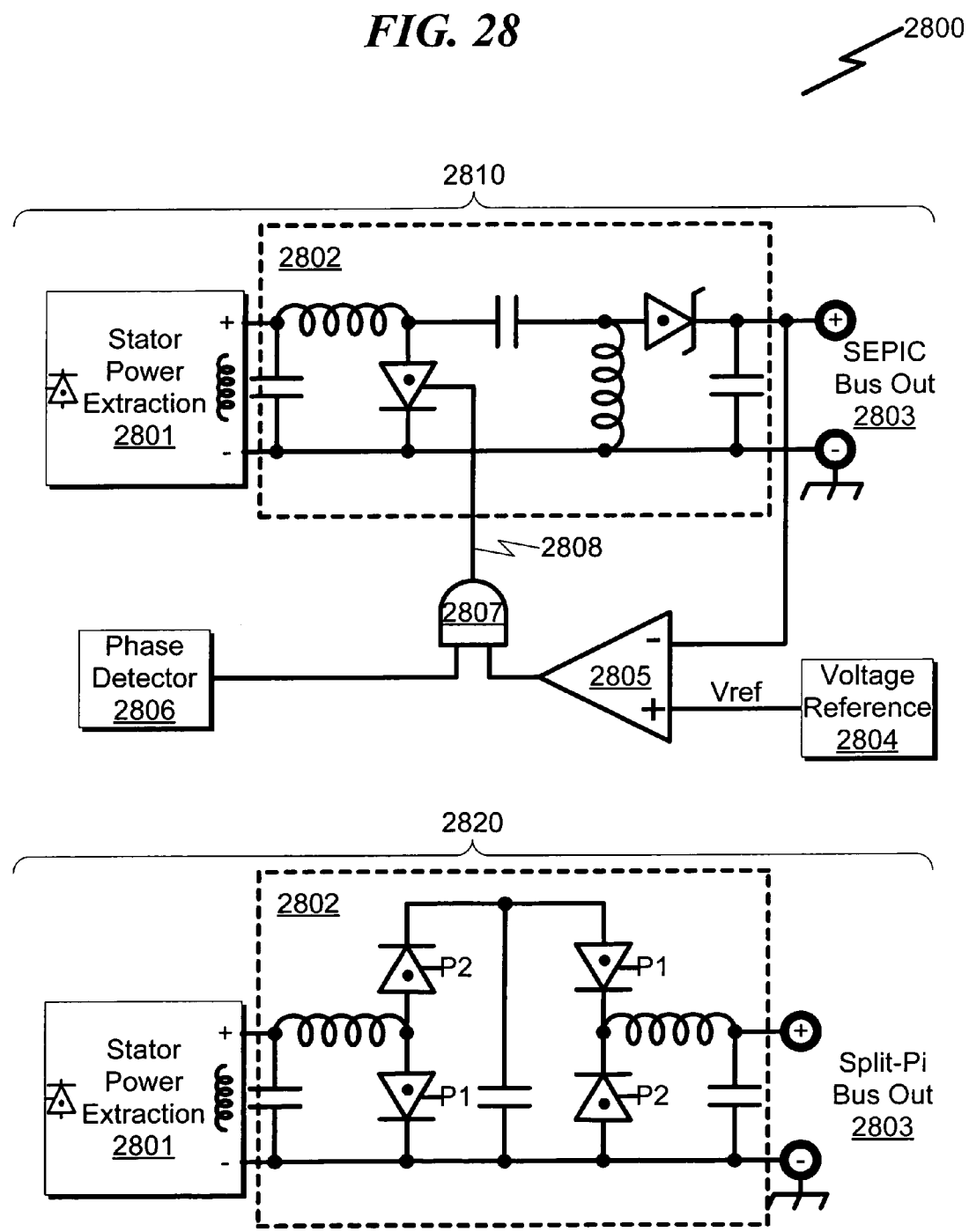
FIG. 28 illustrates an exemplary SEPIC and split-pi buck-boost converter topologies used in some preferred exemplary embodiments of the present invention.

The converter technologies presented previously may also incorporate the SEPIC/Split-Pi topologies generally illustrated in FIG. 28 (2800). The SEPIC topology (2810) can produce buck or boost output similar to previously described topologies, except without the polarity inversion present in previously discussed buck-boost topologies. The Split-Pi configuration (2820) is amenable to the use of MOSFET bridge construction (see FIG. 9 (0920)) utilizing P1/P2 (optimally) non-overlapping phase excitation signals as may be produced by the phase detector previously discussed.

System Summary

The present invention system anticipates a wide variety of variations in the basic theme of construction, but can be generalized as an electric power generation system comprising:
(a) field excitation subsystem;
(b) stator extraction subsystem; and
(c) phase detector responsive to the relative phase relationship between a field rotor coil and a stator coil contained within an electric power generator frame;
wherein
the field excitation subsystem further comprises an electrical driver electrically connected to the field rotor coil;
the stator extraction subsystem receives current from the stator coil and produces the output of the electric power generation system;
the phase detector provides stimulus to the field excitation subsystem to stimulate the field coil based on its relative phase angle to the stator coil; and
the stimulus varies in response to the output load presented to the output of the electric power generation system to affect regulation of the output of the electric power generation system.

This general system summary may be augmented by the various elements described herein to produce a wide variety of invention embodiments consistent with this overall design description.

Method Summary

The present invention method anticipates a wide variety of variations in the basic theme of implementation, but can be generalized as an electric power generation method wherein the method controls an electric power generation system comprising:
(a) field excitation subsystem;
(b) stator extraction subsystem; and
(c) phase detector responsive to the relative phase relationship between a field rotor coil and a stator coil contained within an electric power generator frame;
wherein
the field excitation subsystem further comprises an electrical driver electrically connected to the field rotor coil;
the stator extraction subsystem receives current from the stator coil and produces the output of the electric power generation system;
the phase detector provides stimulus to the field excitation subsystem to stimulate the field coil based on its relative phase angle to the stator coil; and
the stimulus varies in response to the output load presented to the output of the electric power generation system to affect regulation of the output of the electric power generation system;
with the method comprising the steps of:
(1) Detecting the phase of the field rotor coil with respect to the stator coil;
(2) Exciting the field coil based on the phase, power demand from the electric power generation system, and an efficiency/control profile;
(3) Controlling rectification within the stator extraction subsystem based on the phase, the power demand from the electric power generation system, and the efficiency/control profile.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:
An embodiment wherein the electrical driver is modulated using one or more techniques selected from a group consisting of pulse-width modulation (PWM), pulse-position modulation (PPM), amplitude modulation (AM), and phase modulation (PM).
An embodiment wherein the field excitation subsystem operates at a multi-phase field excitation (MPFE) value of one (1) or more.
An embodiment wherein the field rotor coil is rotated within the stator coil responsive to an engine drive, the rotation having a RPM value at a ratio of less than 2:1 with respect to the RPM value of the engine drive.
An embodiment wherein the field excitation subsystem further comprises a boost converter to supply current to the field rotor coil.

An embodiment wherein the electrical driver comprises a bridge driver circuit to differentially drive the field rotor coil.

An embodiment wherein the power supply for the field excitation subsystem is provided by the output of a boost converter, the boost converter deriving its power source from the stator extraction subsystem.

An embodiment wherein the stator extraction subsystem further comprises super-diodes to affect rectification of the stator coil output and conversion of the stator coil output to DC.

An embodiment wherein the stimulus excites the field excitation subsystem differentially in response to the relative phase angle to produce a pulsed DC voltage output in the stator coil.

An embodiment wherein the stator extraction subsystem further comprises a buck-boost converter to receive current from the stator coil and generate the output of the electric power generation system.

An embodiment wherein the phase detector determines the phase relationship between the field rotor coil and the stator coil by monitoring the output voltage of the stator coil and referencing a phase angle of zero when the output voltage crosses a predetermined voltage threshold value.

One skilled in the art will recognize that other embodiments are possible based on combinations of elements taught within the above invention description.

CONCLUSION

An electric power generation system and method that permits enhanced power generation efficiency when applied to rotating electric power generation systems is disclosed. The system may be broadly described as generally improving energy generation efficiency by improving the efficiency of electric current extraction from stator coils in many alternator-based electric power generation systems. The system disclosed comprises a number of preferred embodiments, some of which utilize buck-boost converter technologies in conjunction with super-diode excitation/rectification to minimize $I^2R$ power losses within rotating power generation system components while at the same time reducing heat losses and thus increasing overall rectification circuitry system reliability. The method disclosed generally monitors the position of rotating field coil(s) within a stator coil(s) assembly and excites these coil(s) depending on the desired/demand output power level of the power generation system and the detected position of the field coil(s) in relation to the stator coil(s).

What is claimed is:

1. An electric power generation system comprising:
   (a) field excitation subsystem;
   (b) stator extraction subsystem; and
   (c) phase detector responsive to the relative phase relationship between a field rotor coil and a stator coil contained within an electric power generator frame;
   wherein
   said field excitation subsystem further comprises an electrical driver electrically connected to said field rotor coil;
   said stator extraction subsystem receives current from said stator coil and produces the output of said electric power generation system;
   said phase detector provides stimulus to said field excitation subsystem to stimulate said field coil based on the relative phase angle of said field rotor coil to said stator coil; and
   said stimulus varies in response to the output load presented to said output of said electric power generation system to affect voltage regulation of said output of said electric power generation system wherein the output of the electric power generation system is increased at a low engine rpm by coordinating an excitation of the field rotor in conjunction with a control derived from the relative phase relationship of a rotor phase and stator phase.

2. The electric power generation system of claim 1 wherein said field excitation subsystem operates at a multi-phase field excitation (MPFE) value of one (1) or more.

3. The electric power generation system of claim 1 wherein said field rotor coil is rotated within said stator coil responsive to an engine drive, said field rotor coil rotation having a RPM value at a ratio of less than 2:1 with respect to the RPM value of said engine drive.

4. The electric power generation system of claim 1 wherein said field excitation subsystem further comprises a boost converter to supply current to a bridge driver circuit that differentially drives said field rotor coil.

5. The electric power generation system of claim 1 wherein said electrical driver comprises a bridge driver circuit configured to differentially drive said field rotor coil.

6. The electric power generation system of claim 1 wherein the power supply for said field excitation subsystem is provided by the output of a boost converter, said boost converter deriving source power from said stator extraction subsystem, said field excitation subsystem further comprising a bridge driver circuit configured to differentially drive said field rotor coil.

7. The electric power generation system of claim 1 wherein said stator extraction subsystem further comprises super-diodes controlled by said phase detector to affect rectification of said stator coil output and conversion of said stator coil output to DC.

8. The electric power generation system of claim 1 wherein said stimulus excites said field excitation subsystem differentially in response to said relative phase angle to produce a pulsed DC voltage output in said stator coil.

9. The electric power generation system of claim 1 wherein said stator extraction subsystem further comprises a buck-boost converter to receive current from said stator coil and generate said output of said electric power generation system.

10. The electric power generation system of claim 1 wherein said phase detector determines the phase relationship between said field rotor coil and said stator coil by monitoring the output voltage of said stator coil and referencing a phase angle of zero when said output voltage crosses a predetermined voltage threshold value.

11. An electric power generation method wherein said method controls an electric power generation system comprising:
   (a) field excitation subsystem;
   (b) stator extraction subsystem; and
   (c) phase detector responsive to the relative phase relationship between a field rotor coil and a stator coil contained within an electric power generator frame;
   wherein
   said field excitation subsystem further comprises an electrical driver electrically connected to said field rotor coil;
   said stator extraction subsystem receives current from said stator coil and produces the output of said electric power generation system;

said phase detector provides stimulus to said field excitation subsystem to stimulate said field coil based on the relative phase angle of said field rotor coil to said stator coil; and said stimulus varies in response to the output load presented to said output of said electric power generation system to affect voltage regulation of said output of said electric power generation system;

with said method comprising the steps of:
(1) detecting the phase of said field rotor coil with respect to said stator coil;
(2) exciting said field coil based on said phase, the power demand from said electric power generation system, and an efficiency/control profile;
(3) controlling rectification within said stator extraction subsystem based on said phase, said power demand from said electric power generation system, and said efficiency/control profile wherein the output of the electric power generation system is increased at a low engine rpm by coordinating an excitation of the field rotor in conjunction with a control derived from the relative phase relationship of a rotor phase and stator phase.

12. The electric power generation method of claim 11 wherein said field excitation subsystem operates at a multiphase field excitation (MPFE) value of one (1) or more.

13. The electric power generation method of claim 11 wherein said field rotor coil is rotated within said stator coil responsive to an engine drive, said field rotor coil rotation having a RPM value at a ratio of less than 2:1 with respect to the RPM value of said engine drive.

14. The electric power generation method of claim 11 wherein said field excitation subsystem further comprises a boost converter to supply current to said field rotor coil.

15. The electric power generation method of claim 11 wherein said electrical driver comprises a bridge driver circuit configured to differentially drive said field rotor coil.

16. The electric power generation method of claim 11 wherein the power supply for said field excitation subsystem is provided by the output of a boost converter, said boost converter deriving source power from said stator extraction subsystem.

17. The electric power generation method of claim 11 wherein said stator extraction subsystem further comprises super-diodes controlled by said phase detector to affect rectification of said stator coil output and conversion of said stator coil output to DC.

18. The electric power generation method of claim 11 wherein said stimulus excites said field excitation subsystem differentially in response to said relative phase angle to produce a pulsed DC voltage output in said stator coil.

19. The electric power generation method of claim 11 wherein said stator extraction subsystem further comprises a buck-boost converter to receive current from said stator coil and generate said output of said electric power generation system.

20. The electric power generation method of claim 11 wherein said phase detector determines the phase relationship between said field rotor coil and said stator coil by monitoring the output voltage of said stator coil and referencing a phase angle of zero when said output voltage crosses a predetermined voltage threshold value.

* * * * *